United States Patent
Sun et al.

(10) Patent No.: US 11,032,808 B2
(45) Date of Patent: Jun. 8, 2021

(54) FREQUENCY HOPPING FOR CONTROL RESOURCE SET WITH SINGLE CARRIER WAVEFORM

(71) Applicant: QUALCOMM Incorporated, San Diego, CA (US)

(72) Inventors: Jing Sun, San Diego, CA (US); Tao Luo, San Diego, CA (US); Sony Akkarakaran, Poway, CA (US); Rahul Malik, San Diego, CA (US); Tamer Kadous, San Diego, CA (US); Akula Reddy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 15/898,987

(22) Filed: Feb. 19, 2018

(65) Prior Publication Data

US 2018/0288747 A1 Oct. 4, 2018

Related U.S. Application Data

(60) Provisional application No. 62/478,957, filed on Mar. 30, 2017.

(51) Int. Cl.
*H04W 72/04* (2009.01)
*H04B 7/185* (2006.01)
(Continued)

(52) U.S. Cl.
CPC .......... *H04W 72/042* (2013.01); *H04B 1/713* (2013.01); *H04B 1/7156* (2013.01);
(Continued)

(58) Field of Classification Search
CPC ......... H04L 5/00; H04L 5/001; H04L 5/0012; H04L 5/0053; H04L 5/0048;
(Continued)

(56) References Cited

U.S. PATENT DOCUMENTS

| 2008/0089286 A1* | 4/2008 | Malladi | H04B 1/7143 370/330 |
|---|---|---|---|
| 2011/0188585 A1* | 8/2011 | Miki | H04L 5/001 375/259 |
| 2012/0163335 A1* | 6/2012 | Chung | H04L 5/0023 370/330 |
| 2014/0071914 A1* | 3/2014 | Li | H04B 7/0691 370/329 |

(Continued)

FOREIGN PATENT DOCUMENTS

EP         2315483 A1     4/2011

OTHER PUBLICATIONS

CATT: "On waveform configuration for PUCCH", 3GPP Draft; R1-1700200, 3rd Generation Partnership Project (3GPP), Mobile Competence Centre; 650, Route Des Lucioles; F-06921, Sophia-Antipolis Cedex; France, vol. RAN WG1, No. Spokane, USA; Jan. 16, 2017-Jan. 20, 2017, Jan. 16, 2017 (Jan. 16, 2017), 3 pages, XP051207740, Retrieved from the Internet: URL: http://www.3gpp.org/ftp/Meetings_3GPP_SYNC/RAN1/Docs/.

(Continued)

*Primary Examiner* — Peter Chen
(74) *Attorney, Agent, or Firm* — Qualcomm Incorporated

(57) ABSTRACT

Methods, systems, and devices for wireless communication are described. A base station may identify control information to be transmitted, in a slot, to a user equipment (UE). The base station may determine a configuration for splitting a control resource set for the control information into a first component control resource set and a second component control resource set within a supported bandwidth of the UE. The first component control resource set may be frequency diverse and time diverse from the second component control resource set. The base station may transmit the configuration to the UE.

20 Claims, 16 Drawing Sheets

(51) Int. Cl.
*H04L 27/26* (2006.01)
*H04B 1/713* (2011.01)
*H04L 5/00* (2006.01)
*H04B 1/7156* (2011.01)

(52) U.S. Cl.
CPC ....... *H04B 7/18582* (2013.01); *H04L 5/0007* (2013.01); *H04L 5/0051* (2013.01); *H04L 5/0053* (2013.01); *H04L 27/2605* (2013.01); *H04L 5/0012* (2013.01); *H04L 27/2602* (2013.01)

(58) Field of Classification Search
CPC ... H04L 5/0023; H04L 5/0035; H04L 5/0051; H04L 5/0007; H04L 5/0044; H04L 5/0005; H04L 27/2602; H04L 27/2605; H04W 72/04; H04W 72/042; H04W 72/044; H04W 72/0446; H04W 72/0413; H04W 72/0406; H04W 72/0453; H04W 72/1289; H04B 1/713; H04B 1/7156; H04B 1/18582
See application file for complete search history.

(56) References Cited

U.S. PATENT DOCUMENTS

| | | | | |
|---|---|---|---|---|
| 2014/0112252 A1* | 4/2014 | Hoymann | ............ | H04L 5/0053 370/328 |
| 2017/0332377 A1* | 11/2017 | Tseng | .................... | H04L 5/0053 |
| 2018/0034526 A1* | 2/2018 | Lee | ........................ | H04W 24/10 |
| 2018/0375710 A1* | 12/2018 | Chae | ........................ | H04L 5/00 |
| 2019/0037554 A1* | 1/2019 | Gao | ..................... | H04L 5/0094 |
| 2020/0022121 A1* | 1/2020 | Li | ........................ | H04L 5/0048 |

OTHER PUBLICATIONS

International Search Report and Written Opinion—PCT/US2018/018699—ISA/EPO—dated May 8, 2018.
Panasonic: "Configuration of DL control resource set and UE bandwidth", 3GPP Draft; R1-1700639, 3rd Generation Partnership Project (3GPP), Mobile Competence Centre, 650, Route Des Lucioles; F-06921 Sophia-Antipolis Cedex, France, vol. RAN WG1, No. Spokane, USA; Jan. 16, 2017-Jan. 20, 2017, Jan. 16, 2017 (Jan. 16, 2017), pp. 1-5, XP051208164, Retrieved from the Internet: URL: http://www.3gpp.org/ftp/Meetings_3GPP_SYNC/RAN1/Docs/.

* cited by examiner

FREQUENCY HOPPING FOR CONTROL RESOURCE SET WITH SINGLE CARRIER WAVEFORM

CROSS REFERENCES

The Application for Patent claims priority to U.S. Provisional Patent Application No. 62/478,957 by SUN, et al., entitled "Frequency Hopping For Control Resource Set With Single Carrier Waveform," filed Mar. 30, 2017, assigned to the assignee hereof.

BACKGROUND

The following relates generally to wireless communication, and more specifically to frequency hopping for control resource set with single carrier waveform.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Certain wireless communication systems may be configured to support OFDMA communications that include multiple carrier transmissions. As one example, control information may typically be sent in a control resource set (corset) that includes a set of physical resource blocks (PRBs) that are transmitted over a number of OFDM symbols. Such configurations provide frequency diversity by spreading the control information (e.g., physical downlink control information (PDCCH)) over the coreset. Such wireless communication systems, however, may not be configured to support single carrier waveform transmission of control information that uses frequency hopping within the coreset while maintaining the single carrier waveform.

SUMMARY

The described techniques relate to improved methods, systems, devices, or apparatuses that support frequency hopping for control resource set with single carrier waveform. Generally, the described techniques provide for a base station to use frequency hopping within a coreset (e.g., control information) that splits the coreset into multiple components in time over different orthogonal frequency division multiplexing (OFDM) symbols. The split can include splitting OFDM symbols with larger subcarrier spacing and each component coreset may have its own demodulation reference signal (DMRS). For example, the base station may identify the control information to be transmitted to a user equipment (UE) in a slot. The control information may be transmitted to the UE in a single carrier transmission. The base station may split the control information into a control resource set that includes first and second component control resource sets. The first and second component control resource sets may be frequency and time diverse with respect to each other and may also be within the bandwidth that the UE is configured to support. The base station may transmit information to the UE indicative of the splitting configuration and transmit the first and second component control resource sets (along with the associated DMRS signals for each). The UE may receive the splitting configuration information and use this to determine identify where to look for the first and second component control resource sets.

A method of wireless communication is described. The method may include identifying control information to be transmitted, in a slot, to a UE, determining a configuration for splitting a control resource set for the control information into a first component control resource set and a second component control resource set within a supported bandwidth of the UE, the first component control resource set being frequency diverse and time diverse from the second component control resource set, and transmitting the configuration to the UE.

An apparatus for wireless communication is described. The apparatus may include means for identifying control information to be transmitted, in a slot, to a UE, means for determining a configuration for splitting a control resource set for the control information into a first component control resource set and a second component control resource set within a supported bandwidth of the UE, the first component control resource set being frequency diverse and time diverse from the second component control resource set, and means for transmitting the configuration to the UE.

Another apparatus for wireless communication is described. The apparatus may include a processor, memory in electronic communication with the processor, and instructions stored in the memory. The instructions may be operable to cause the processor to identify control information to be transmitted, in a slot, to a UE, determine a configuration for splitting a control resource set for the control information into a first component control resource set and a second component control resource set within a supported bandwidth of the UE, the first component control resource set being frequency diverse and time diverse from the second component control resource set, and transmit the configuration to the UE.

A non-transitory computer readable medium for wireless communication is described. The non-transitory computer-readable medium may include instructions operable to cause a processor to identify control information to be transmitted, in a slot, to a UE, determine a configuration for splitting a control resource set for the control information into a first component control resource set and a second component control resource set within a supported bandwidth of the UE, the first component control resource set being frequency diverse and time diverse from the second component control resource set, and transmit the configuration to the UE.

Some examples of the method, apparatus, and non-transitory computer-readable medium described above may further include processes, features, means, or instructions for transmitting a DMRS and the control information in the first component control resource set and the second component control resource set according to the configuration.

Some examples of the method, apparatus, and non-transitory computer-readable medium described above may further include processes, features, means, or instructions for transmitting the first component control resource set comprising a first portion of coded bits of the control information to the UE. Some examples of the method, apparatus, and non-transitory computer-readable medium described above may further include processes, features, means, or instructions for transmitting the second component control resource set comprising a second portion of coded bits of the control information to the UE.

Some examples of the method, apparatus, and non-transitory computer-readable medium described above may further include processes, features, means, or instructions for selecting, based at least in part on the supported bandwidth of the UE, frequency ranges of the first component control resource set and the second component control resource set.

In some examples of the method, apparatus, and non-transitory computer-readable medium described above, a first frequency range associated with the first component control resource set and a second frequency range associated with the second component control resource set may be proximate to opposing ends of the supported bandwidth of the UE.

In some examples of the method, apparatus, and non-transitory computer-readable medium described above, the supported bandwidth of the UE may be less than an available system bandwidth.

In some examples of the method, apparatus, and non-transitory computer-readable medium described above, the first component control resource set may be a same size as the second component control resource set with respect to time-frequency resources.

Some examples of the method, apparatus, and non-transitory computer-readable medium described above may further include processes, features, means, or instructions for identifying one or more control channel elements (CCEs) associated with the control information. Some examples of the method, apparatus, and non-transitory computer-readable medium described above may further include processes, features, means, or instructions for mapping each CCE of the one or more CCEs into a first component CCE associated with the first component control resource set and a second component CCE associated with the second component control resource set.

Some examples of the method, apparatus, and non-transitory computer-readable medium described above may further include processes, features, means, or instructions for mapping each CCE of the one or more CCEs according to a component CCE mapping scheme.

In some examples of the method, apparatus, and non-transitory computer-readable medium described above, the component CCE mapping scheme comprises mapping each component CCE sequentially in time between the first component control resource set and the second component control resource set.

In some examples of the method, apparatus, and non-transitory computer-readable medium described above, the component CCE mapping scheme comprises: indexing each component CCE sequentially in time within each of the first component control resource set and the second component control resource set. Some examples of the method, apparatus, and non-transitory computer-readable medium described above may further include processes, features, means, or instructions for permutating the component CCEs within each of the first component control resource set and the second component control resource set using the component CCE index and a random seed. Some examples of the method, apparatus, and non-transitory computer-readable medium described above may further include processes, features, means, or instructions for mapping each component CCE in the first component control resource set and the second component control resource set according to the permutated component CCE index.

In some examples of the method, apparatus, and non-transitory computer-readable medium described above, the random seed may be selected based on one or more of a slot index of the slot, an index associated with each of the first component control resource set and the second component control resource set, and a base station configured parameter.

In some examples of the method, apparatus, and non-transitory computer-readable medium described above, the control information is to be transmitted to the UE in a single carrier transmission.

A method of wireless communication is described. The method may include receiving, at a UE, signaling identifying a configuration for a control resource set in a slot, wherein the control resource set is split into a first component control resource set and a second component control resource set within a supported bandwidth of the UE, the first component control resource set being frequency diverse and time diverse from the second component control resource set and receiving control information in the first component control resource set and the second component control resource set according to the configuration.

An apparatus for wireless communication is described. The apparatus may include means for receiving, at a UE, signaling identifying a configuration for a control resource set in a slot, wherein the control resource set is split into a first component control resource set and a second component control resource set within a supported bandwidth of the UE, the first component control resource set being frequency diverse and time diverse from the second component control resource set and means for receiving control information in the first component control resource set and the second component control resource set according to the configuration.

Another apparatus for wireless communication is described. The apparatus may include a processor, memory in electronic communication with the processor, and instructions stored in the memory. The instructions may be operable to cause the processor to receive, at a UE, signaling identifying a configuration for a control resource set in a slot, wherein the control resource set is split into a first component control resource set and a second component control resource set within a supported bandwidth of the UE, the first component control resource set being frequency diverse and time diverse from the second component control resource set and receive control information in the first component control resource set and the second component control resource set according to the configuration.

A non-transitory computer readable medium for wireless communication is described. The non-transitory computer-readable medium may include instructions operable to cause a processor to receive, at a UE, signaling identifying a configuration for a control resource set in a slot, wherein the control resource set is split into a first component control resource set and a second component control resource set within a supported bandwidth of the UE, the first component control resource set being frequency diverse and time diverse from the second component control resource set and receive control information in the first component control resource set and the second component control resource set according to the configuration.

Some examples of the method, apparatus, and non-transitory computer-readable medium described above may further include processes, features, means, or instructions for receiving a DMRS in the first component control resource set and the second component control resource set according to the configuration.

Some examples of the method, apparatus, and non-transitory computer-readable medium described above may further include processes, features, means, or instructions for identifying, based at least in part on a supported bandwidth of the UE, a first frequency range associated with the first component control resource set used for transmitting the control information and a second frequency range associated with the second component control resource set used for transmitting the control information.

In some examples of the method, apparatus, and non-transitory computer-readable medium described above, the first frequency range and the second frequency range may be proximate to opposing ends of the supported bandwidth of the UE.

Some examples of the method, apparatus, and non-transitory computer-readable medium described above may further include processes, features, means, or instructions for receiving the signaling identifying the configuration during a radio resource configuration (RRC) exchange between a base station and the UE.

Some examples of the method, apparatus, and non-transitory computer-readable medium described above may further include processes, features, means, or instructions for identifying a mapping of one or more CCEs associated with the control information, the mapping comprising each CCE of the one or more CCEs being mapped into a first component CCE associated with the first component control resource set and a second component CCE associated with the second component control resource set.

In some examples of the method, apparatus, and non-transitory computer-readable medium described above, the mapping comprises each component CCE being mapped sequentially in time between the first component control resource set and the second component control resource set.

In some examples of the method, apparatus, and non-transitory computer-readable medium described above, the mapping comprises each component CCE being indexed sequentially in time within each of the first component control resource set and the second component control resource set, the component CCEs within each of the first component control resource set and the second component control resource set being permutated using the component CCE index and a random seed, and each component CCE in the first component control resource set and the second component control resource set being mapped according to the permutated component CCE index.

In some examples of the method, apparatus, and non-transitory computer-readable medium described above, the first component control resource set may be the same size as the second component control resource set with respect to time-frequency resources. In some examples of the method, apparatus, and non-transitory computer-readable medium described above, the signal identifying the configuration for the control resource set in a slot is received in a single carrier transmission.

DETAILED DESCRIPTION

Figure 1:
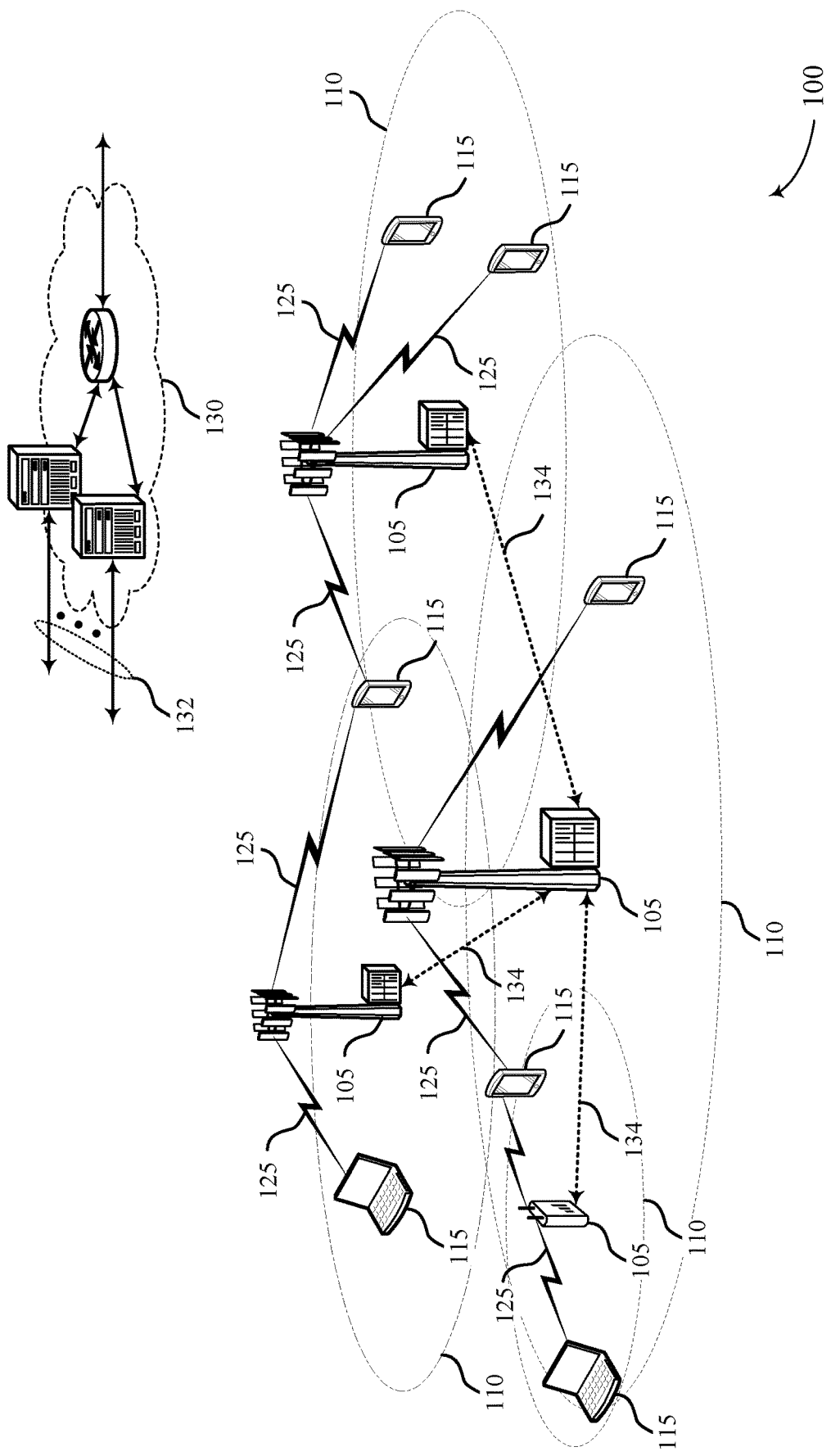
FIG. 1 illustrates an example of a system for wireless communication that supports frequency hopping for control resource set with single carrier waveform in accordance with aspects of the present disclosure.

Wireless communication systems may be configured to use orthogonal frequency division multiple access (OFDMA) techniques for transmission of control information. The control resource set may be defined in conventional systems as a coreset that includes a set of physical resource blocks (PRBs) spread over a certain number of orthogonal frequency division multiplexing (OFDM) symbols. That is, the control information (e.g., physical downlink control channel (PDCCH)) may be transmitted in a downlink transmission from the base station to the user equipment (UE(s)) in multiple resource blocks occurring in multiple slots and using multiple carrier waveforms. Such systems, however, may not be configured to support single carrier waveform transmission of the control information in addition to the OFDMA waveform. For example, such conventional systems may be configured to support frequency hopping within a coreset to provide improved diversity while maintaining a single carrier waveform transmission.

Aspects of the disclosure are initially described in the context of a wireless communication system. Aspect(s) of the described techniques may extend the downlink link budget to edge UEs (for example) by using a single carrier waveform for transmission of the control information (e.g., PDCCH). The single carrier waveform transmission may be used in addition to and/or alternatively to the conventional OFDMA waveform transmissions, e.g., the single carrier waveform may be used for UEs experiencing a certain pathloss value, in the situation where link budget becomes a concern, and the like.

In some aspects, the described techniques use frequency hopping with the coreset where the coreset (e.g., control resource set) is split into multiple (e.g., two or more) component coresets (e.g., component control resource sets) in time over different OFDM symbols. The splitting (or configuration) may use larger subcarrier spacing and each component may have its own associated demodulation reference signal (DMRS). The splitting may include placing the component coresets in different sets of resource blocks (e.g., far apart but within the UE's supported bandwidth, which may include the full system bandwidth of a portion thereof) may improve diversity. Also, within each hop of the coreset using a single carrier, the peak-to-average power ratio (PAPR) may be improved and, since the coreset is transmitted within the UE's bandwidth, reduce power consumption of the UE (e.g., as compared to the case where the UE is monitoring the whole system bandwidth).

In some aspects, a base station may determine or otherwise identify the control information to be transmitted to the UE. The control information may be transmitted in a slot (e.g., a single slot) and, in some examples, using a single carrier transmission. The base station may identify or otherwise determine a configuration for splitting a control resource set for the control information. The configuration may include splitting the control resource set into first and second component control resource sets that are within the supported bandwidth of the UE. The first and second component control resource sets may be frequency and time diverse with respect to each other. The base station may transmit the configuration (or information indicative of the splitting configuration) to the UE. The UE may receive the signaling identifying or otherwise indicative of the splitting configuration and use this to receive the control information in the first and second component control resource sets.

Aspects of the disclosure are further illustrated by and described with reference to apparatus diagrams, system diagrams, and flowcharts that relate to frequency hopping for control resource set with single carrier waveform.

FIG. 1 illustrates an example of a wireless communication system 100 in accordance with various aspects of the present disclosure. The wireless communication system 100 includes base stations 105, UEs 115, and a core network 130. In some examples, the wireless communication system 100 may be a Long Term Evolution (LTE), LTE-Advanced (LTE-A) network, or a New Radio (NR) network. In some cases, wireless communication system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communication system 100 may include uplink transmissions from a UE 115 to a base station 105, and/or downlink transmissions, from a base station 105 to a UE 115. Control information and data may be multiplexed on an uplink channel or downlink channel according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station 105 without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communication system 100 may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller. In some examples, base stations 105 may be macro cells, small cells, hot spots, or the like. Base stations 105 may also be referred to as evolved NodeBs (eNBs) or gNodeBs (gNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communication system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communication system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communication system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use automated repeat request (ARQ) and/or Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device, base station 105, or core network 130 supporting radio bearers for user plane data. At the Physical (PHY) layer, transport channels may be mapped to physical channels.

Time intervals in LTE or NR may be expressed in multiples of a basic time unit. Time resources may be organized according to radio frames of length of 10 ms, which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be. In some aspects, wireless communication system 100 may utilize control channel elements (CCEs). A CCE may include a set of 36 resource elements to which part or all of a PDCCH message can be mapped.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communication system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communication system 100 may utilize both licensed and unlicensed radio frequency spectrum bands. For example, wireless communication system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

A base station 105 may be configured to support aspect(s) of the present disclosure for frequency hopping for control resource set with single carrier waveform. For example, the base station 105 may identify control information to be transmitted, in a slot, to a UE 115. The base station 105 may determine a configuration for splitting a control resource set for the control information into a first component control resource set and a second component control resource set within a supported bandwidth of the UE 115. The first component control resource set may be frequency diverse and time diverse from the second component control resource set. The base station 105 may transmit the configuration to the UE 115.

A UE 115 may also be configured to support aspect(s) of the present disclosure for frequency hopping for control resource set with single carrier waveform. For example, the UE 115 may receive signaling identifying a configuration for a control resource set in a slot. The control resource set may be split into a first component control resource set and a second component control resource set within a supported bandwidth of the UE 115. The first component control resource set may be frequency diverse and time diverse from the second component control resource set. The UE 115 may receive control information in the first component control resource set and the second component control resource set according to the configuration.

Figure 2:
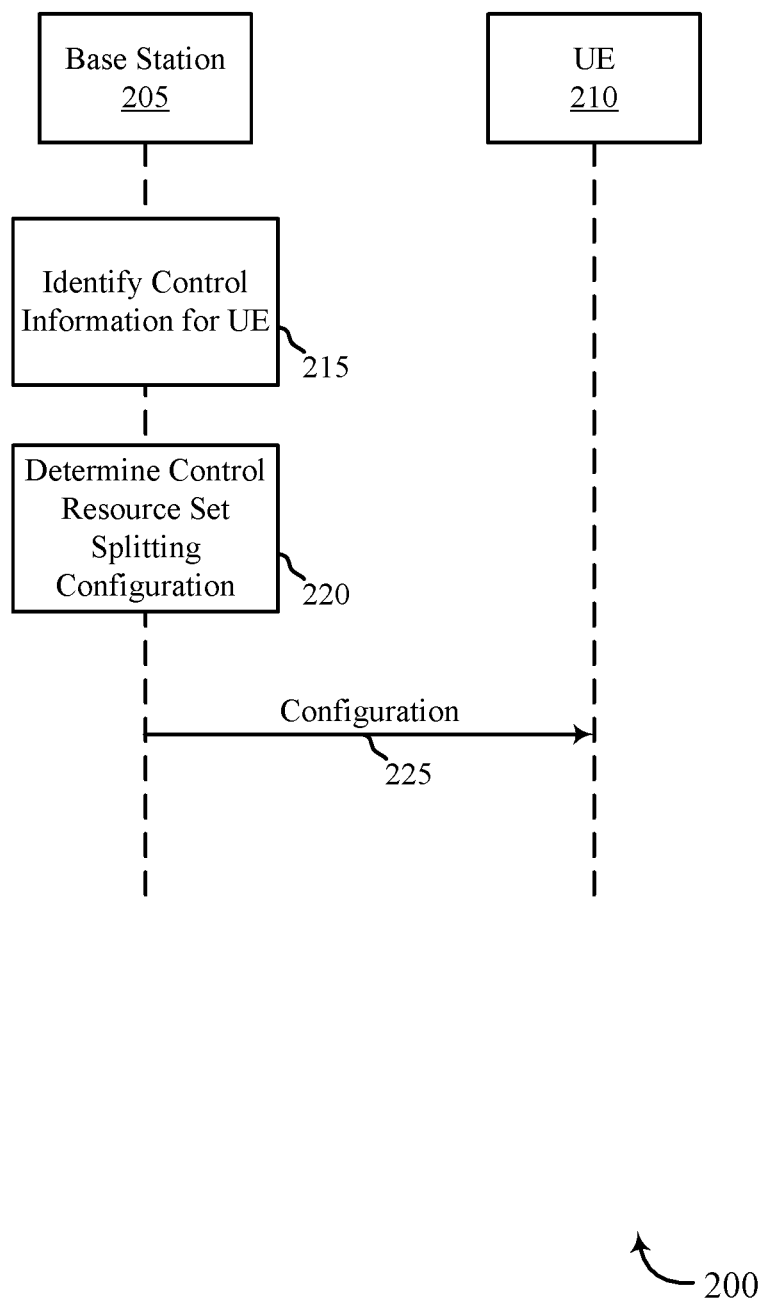
FIG. 2 illustrates an example of a process that supports frequency hopping for control resource set with single carrier waveform in accordance with aspects of the present disclosure.

FIG. 2 illustrates an example of a process 200 that supports frequency hopping for control resource set with single carrier waveform in accordance with various aspects of the present disclosure. In some examples, process 200 may implement aspects of wireless communication system 100. Process 200 may include a base station 205 and a UE 210, which may be examples of the corresponding devices described herein. Broadly, process 200 illustrates one non-limiting example of the base station 205 using frequency hopping within a coreset in a single carrier waveform transmission by splitting the coreset into multiple components that are time/frequency diverse with respect to each other during the slot.

At 215, base station 205 may identify control information for transmission to UE 210. The control information may be transmitted in a slot and, in some examples, using a single carrier waveform transmission. The control information may include a PDCCH transmission including downlink control information (DCI) that conveys uplink and/or downlink resource assignments for UE 210 or a group of UEs, as well as other information used by UE 210 for uplink and/or downlink information. The DCI may include one of a plurality of DCI formats.

In some aspects, the control information may be transmitted using one or more CCEs. The number of CCEs used to transmit the control information may be based on the number of OFDM symbols used to convey the control information, bandwidth information, antenna port count, and the like. Examples of CCEs used to convey the control information may include 1, 2, 4, 8, or more CCEs depending on whether the control information is UE-specific or common, the aggregation level used for the transmission, and the like. In one non-limiting example, a traditional CCE may occupy a number of resource element groups (REGs), e.g., six continuous REGs, with each REG comprising a certain number of resource elements (REs), e.g., twelve REs.

At 220, base station 205 may determine a control resource set splitting configuration for the control information. For example, base station 205 may determine a configuration for splitting a control resource set for the control information into two or more component control resource sets, e.g., a first component control resource set and a second component control resource set. It is to be understood that the base station 205 may split the control resource set into more than two component control resource sets. The component control resource sets may be frequency diverse and time diverse with respect to each other in the slot. The component control resource sets may use frequency ranges that are within the supported bandwidth of UE 210, which may be the full system bandwidth or may be a subset of the system bandwidth.

In some aspects, each component control resource set may use a different frequency range. For example, base station 205 may select different frequency ranges for each component control resource set based on the supported bandwidth of UE 210, e.g., a first frequency range for the first component control resource set and a second frequency range for the second component control resource set. The frequency ranges may be selected to have frequency diversity between the component control resource sets generally and, in one example, may be selected to be at each end of the supported UE bandwidth.

In some aspects, the different component control resource sets may carry different coded bits of the control information. For example, the first component control resource set may carry or otherwise convey a first portion of the coded bits of the control information and the second component control resource set may carry or otherwise convey a second portion of the coded bits of the control information. In some aspects, the different component control resource set may be the same size, e.g., carry the same amount of coded bits, occupy the same number of REs, REGs, CCEs, etc.

In some aspects, base station 205 may identify CCEs associated with the control information and map the CCEs into component CCEs. For example, base station 205 may map each CCE of the CCEs for the control information into a first component CCE associated with the first component control resource set and map a second component CCE associated with the second component control resource set. The CCEs may be mapped according to a CCE mapping scheme. The CCE mapping scheme may be determined by base station 205 dynamically, based on preconfigured information or metrics, or be signaled from the network. As discussed above, the number of CCEs associated with the control information may vary depending upon various factors.

In some aspects, the CCE mapping scheme may include mapping each component CCE sequentially in time between the first component control resource set and the second component control resource set. That is, the first CCE may be mapped such that the first component CCE in the first component control resource set occurring in the slot may include the first portion of coded bits of the control information and the second component CCE in the second component control resource set occurring in the slot may include the second portion of coded bits of the control information. Continuing in sequence, the second CCE associated with the control information may be mapped to first and second component CCEs that are positioned after the first and second component CCEs of the first CCE associated with the control information. This example CCE mapping configuration may reduce complexity at the base station 205 and the UE 210.

In some aspects, the CCE mapping scheme may include indexing each component CCE sequentially in time with the first and second component control resource sets. For example, the first CCE associated with the control information may be split into first and second component CCEs having indexes CCE1_1 and CCE1_2. The second CCE associated with the control information may be split into first and second component CCEs having indexes CCE2_1 and CCE2_1. This may continue for the remainder of the CCEs associated with the control information. Next, base station 205 may permutate the component CCEs with the first and second component control resource sets using the CCE index and a random seed. The random seed may be based on various factors, either alone or in combination, such as a slot index of the slot, an index associated with each of the first and second component control resource sets, a base station configured parameter, and the like. Base station 205 may then map each component CCE in the first and second component control resource sets according to the permutated component CCE index.

At 225, base station 205 may transmit the configuration to UE 210. The transmitted configuration information may carry or otherwise convey an indication of the CCE mapping scheme, the frequency ranges used for the first and second component control resource sets, the symbol periods carrying the first and second component control resource sets, and the like. In some aspects, the base station 205 may also transmit a DMRS and the control information in the first and second component control resource sets according to the configuration. Thus, base station 205 may transmit the DMRS and then the first component control resource set that comprises the first portion of the coded bits to the UE 210 using one set of time-frequency resources and then transmit another DMRS and then the second component control resource set that comprises the second portion of the coded bits to the UE 210 using a different set of time-frequency resources. In some aspects, the control information is transmitted in a control region of the slot.

Figure 3:
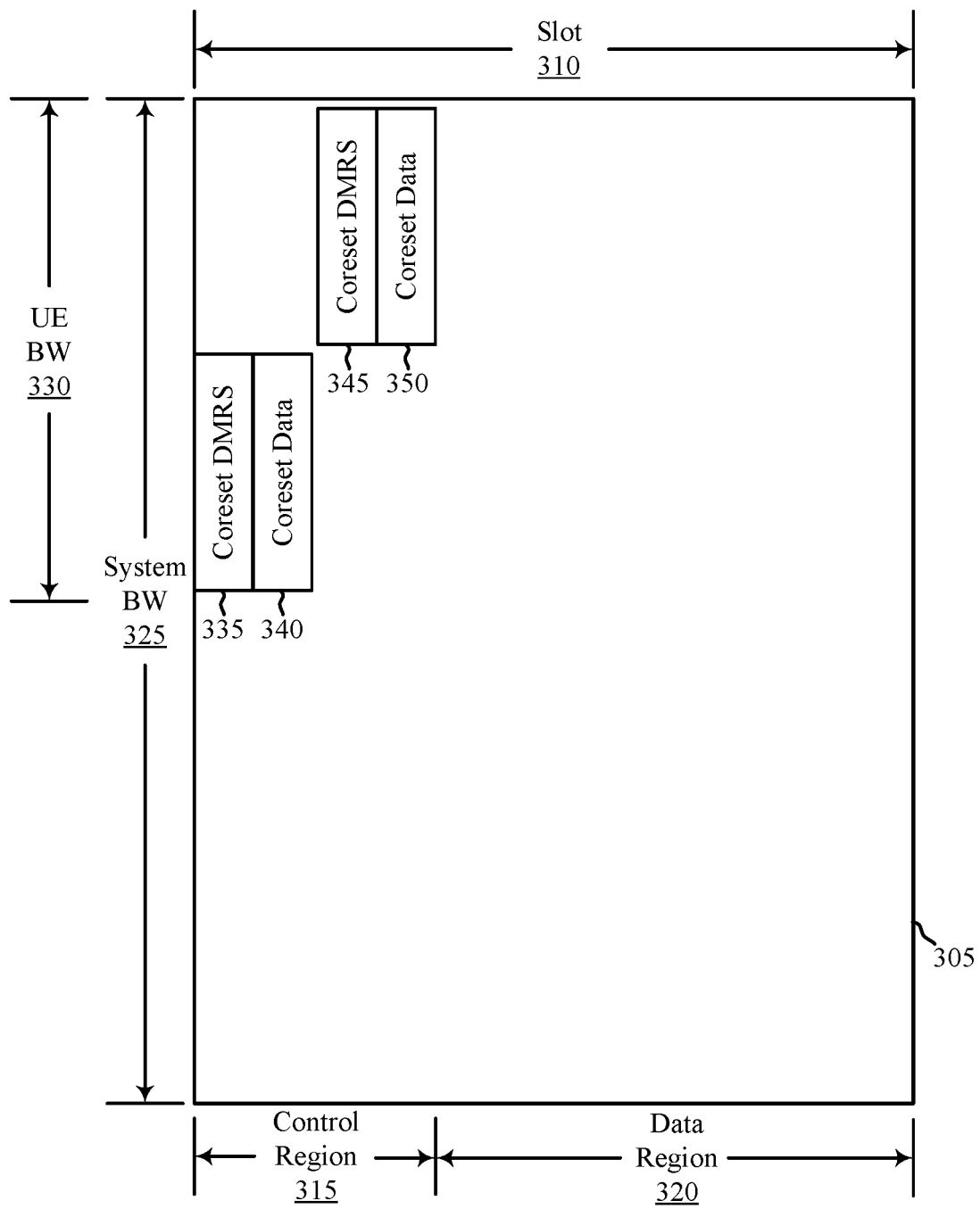
FIG. 3 illustrates an example of a resource block that supports frequency hopping for control resource set with single carrier waveform in accordance with aspects of the present disclosure.

FIG. 3 illustrates an example of a resource block 300 that supports frequency hopping for control resource set with single carrier waveform in accordance with various aspects of the present disclosure. In some examples, resource block 300 may implement aspects of wireless communication system 100 and/or processes 200 or 400 described herein. In some aspects, the resource block 300 may be an example of a downlink resource block transmitted from a base station to a UE.

Resource block 300 may include one physical resource block (PRB) 305 spanning one slot 310. The slot 310 may consist of a number of REs in the time domain and a number of carriers in the frequency domain, as is discussed above. The slot 310 may be divided into a control region 315 and a data region 320. The control region 315 may be subdivided into a UE-specific portion and/or a common portion. The control region 315 may be used to carry or otherwise convey control information to UE(s) operating within the coverage area of a base station.

The number of subcarriers (or tones or frequencies) occupying the slot 310 may establish the system bandwidth 325. In one example, the system bandwidth 325 may include 12 subcarriers, or some other number of subcarriers. As discussed above, an intersection of one subcarrier occurring during one symbol period may constitute a RE and the control information may be carried in one or more CCEs (e.g., REs forming REGs and REGs forming CCE(s)).

In some aspects, the UE may be configured to support the full system bandwidth (e.g., system bandwidth 325) or may be configured to support a subset of the full system bandwidth. By way of example only, resource block 300 illustrates the example where the UE supports a subset of the system bandwidth, which may be referred to as the UE bandwidth 330.

In accordance with aspects of the present disclosure, the control resource set for the control information may be split into first and second component control resource sets, with each component control resource set having an associated DMRS. This is illustrated in resource block 300 as the first component control resource set shown as coreset data 340 and the associated DMRS shown as coreset DMRS 335. Further, the second component control resource set is shown as coreset data 350 and the associated DMRS is shown as coreset DMRS 345. The first coreset data 340 and second coreset data 350 are time diverse and frequency diverse with respect to each other and, in some examples, may be transmitted in a single carrier waveform. The first coreset data 340 may carry the first portion of coded bits of the control information and the second coreset data 350 may carry the second portion of coded bits of the control information.

In some aspects, resource block 300 illustrates one example of introducing frequency hopping within the coreset where the coreset is split into multiple (e.g., two) components in time over different OFDM symbols. This split may be achieved by splitting OFDM symbols, with larger subcarrier spacing. Each component coreset (e.g., first coreset data 340 and second coreset data 350) will have its own DMRS (e.g., first coreset DMRS 335 and second coreset DMRS 345). Placing the component coresets in different set of RBs (e.g., far apart but still within the UE's monitoring bandwidth) may provide large diversity. In one example, the component coresets are placed at the two ends of the UE monitoring bandwidth, e.g., proximate to opposing ends of the UE bandwidth 330. The UE bandwidth 330 may be the same as the full system bandwidth 325, but can also be a smaller bandwidth for power saving at the UE. Thus, resource block 300 may provide for, within each hop of the coreset the waveform is single carrier, thus maintain improved PAPR at the UE. Since the component coresets are still within UE's monitoring bandwidth, there is no extra power consumption at the UE for monitoring the coreset.

In some aspects, the component coresets are of the same size. Defining a component coreset may include a CCE that is formed by one component CCE from each component coreset. In this scenario, even an aggregation level of 1 PDCCH has components in each component coreset and has full diversity. As another example, an aggregation level of 4 PDCCH may have 4 CCEs and each CCE has 2 component CCEs, one in each component coreset. In this example, the aggregation level PDCCH has 4 component CCEs in component coreset 1 (e.g., first coreset data 340) and another 4 component CCEs in component coreset 2 (e.g., second coreset data 350).

In some aspects, the component CCE mapping may include for PDCCH to CCE mapping, PDCCH blocking may be achieved at the CCE level, e.g., may avoid two PDCCHs using the same component CCE in one component coreset but use different component CCE in the other component coreset. In one design for localized mapping, in each component coreset, define N component CCEs, and sequentially (in time domain) index the component CCEs. The localized mapping may include mapping component CCE x in each component coreset to CCE x. In this way, continuous CCEs will be mapped to continuous (time) component CCEs.

In another design for distributed mapping, each component coreset may define N component CCEs, with each component CCE mapped sequentially (in time domain) and indexed. A random permutation may be defined for the set of component CCEs in each component coreset. A random seed may depend on the slot index, component coreset index within the coreset, and additional gNB (or base station) specific random seed. The distributed mapping may include mapping component CCE x (after permutation) in each component coreset to CCE x. This may achieve some interference diversity in case different gNBs experience coreset collision. So one component CCE from one gNB will not persistently interfere with another component CCE from another gNB.

Figure 4:
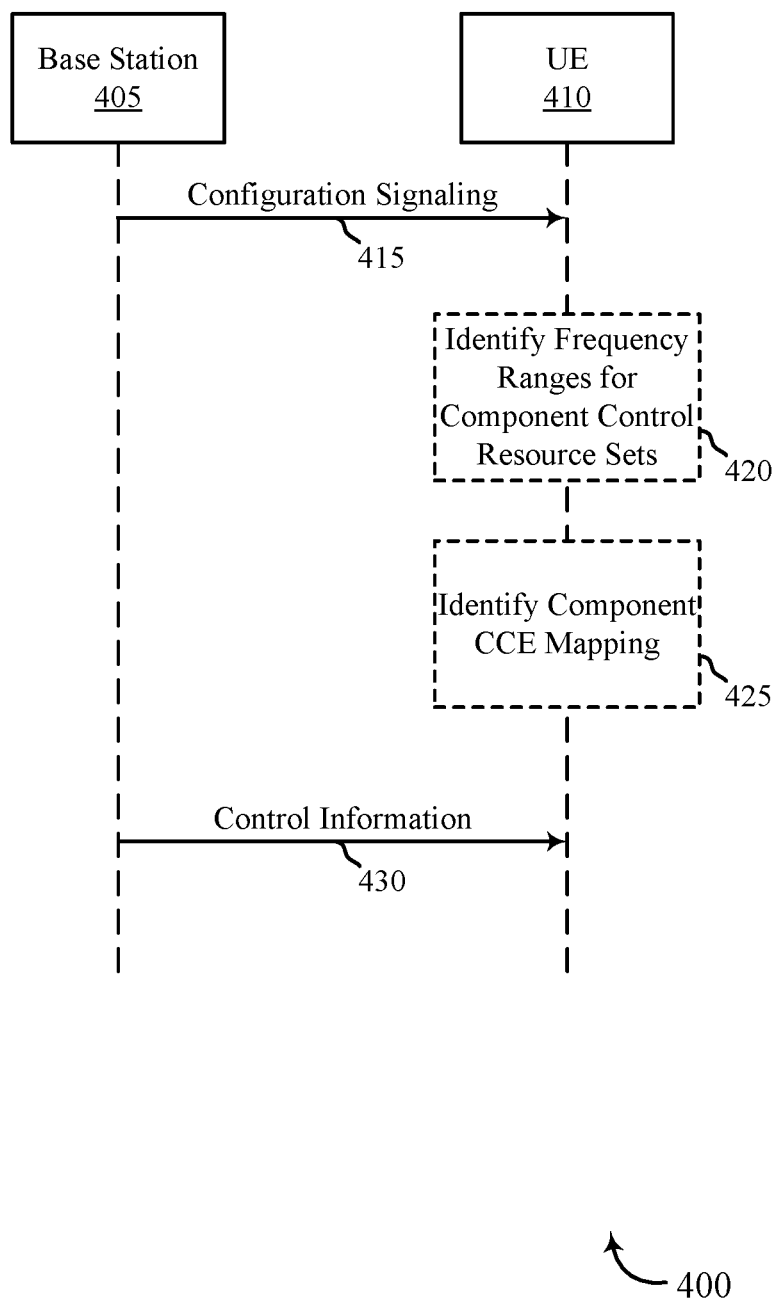
FIG. 4 illustrates an example of a process that supports frequency hopping for control resource set with single carrier waveform in accordance with aspects of the present disclosure.

FIG. 4 illustrates an example of a process 400 that supports frequency hopping for control resource set with single carrier waveform in accordance with various aspects of the present disclosure. In some examples, process 400 may implement aspects of wireless communication system 100, process 200, and/or resource block 300, as described herein. Process 400 may include a base station 405 and a UE 410, which may be examples of the corresponding devices described herein. Broadly, process 400 illustrates one example where a UE receives and identifies control information transmitted in first and second component control resource sets that are time diverse and frequency diverse with respect to each other.

At 415, base station 405 may transmit the configuration signaling to UE 410. The transmitted configuration signaling information may carry or otherwise convey an indication of the CCE mapping scheme, the frequency ranges used for the first and second component control resource sets, the symbol periods carrying the first and second component control resource sets, and the like. In some aspects, the UE 410 may receive the signaling identifying the configuration dynamically, when establishing an active link with the base station 405, and the like. In one example, the UE 410 may receive the signaling during a radio resource control (RRC) establishment procedure with the base station 405.

In some aspects, the signaling may identify the configuration for the control resource set in the slot of, in some examples, a single carrier transmission. The control resource set may be split into multiple sets, e.g., a first component control resource set and a second component control resource set within a supported bandwidth of the UE 410. The multiple sets may be diverse with respect to each other, e.g., the first component control resource set may be frequency diverse and time diverse from the second component control resource set.

At 420, the UE 410 may optionally identify the frequency ranges used for the component control resource sets. For example, the UE 410 may use the supported UE bandwidth to identify a first frequency range associated with the first component control resource set used for transmitting the control information and identify a second frequency range associated with the second component control resource set used for transmitting the control information. As is discussed, the first and second frequency ranges may be far apart and, in some examples, may be proximate to the opposing ends of the UE supported bandwidth.

In some aspects, the base station 405 may also transmit a DMRS and the control information in the first and second component control resource sets according to the configuration. Thus, base station 405 may transmit the DMRS and then the first component control resource set that comprises the first portion of the coded bits to the UE 410 using one set of time-frequency resources and then transmit another DMRS and then the second component control resource set that comprises the second portion of the coded bits to the UE 410 using a different set of time-frequency resources. In some aspects, the control information is transmitted in a control region of the slot.

At 425, the UE 410 may optionally identify a component CCE mapping scheme used for the transmission of the control information. For example, the UE 410 may identify a mapping of CCE(s) associated with the control information. The mapping may include mapping each CCE into a first component CCE associated with the first component control resource set and a second component CCE associated with the second component control resource set. Different mapping schemes may be used, such as a localized mapping scheme where each component CCE is mapped sequentially in time between the first component control resource set and the second component control resource set.

In some aspects, another mapping scheme may include a distributed mapping scheme where the mapping includes each component CCE being indexed sequentially in time within each of the first component control resource set and the second component control resource set. The component CCEs within each of the first component control resource set and the second component control resource set may be permutated using the component CCE index and a random seed. Each component CCE in the first component control resource set and the second component control resource set may be mapped according to the permutated component CCE index. In some aspects, the first and second component control resource sets may be the same size with respect to each other.

At 430, the UE 410 may receive the control information from the base station 405. The control information may be received in the first component control resource set and the second component control resource set, as described herein. A DMRS may also be received along with the first component control resource set and along with the second component control resource set.

Figure 5:
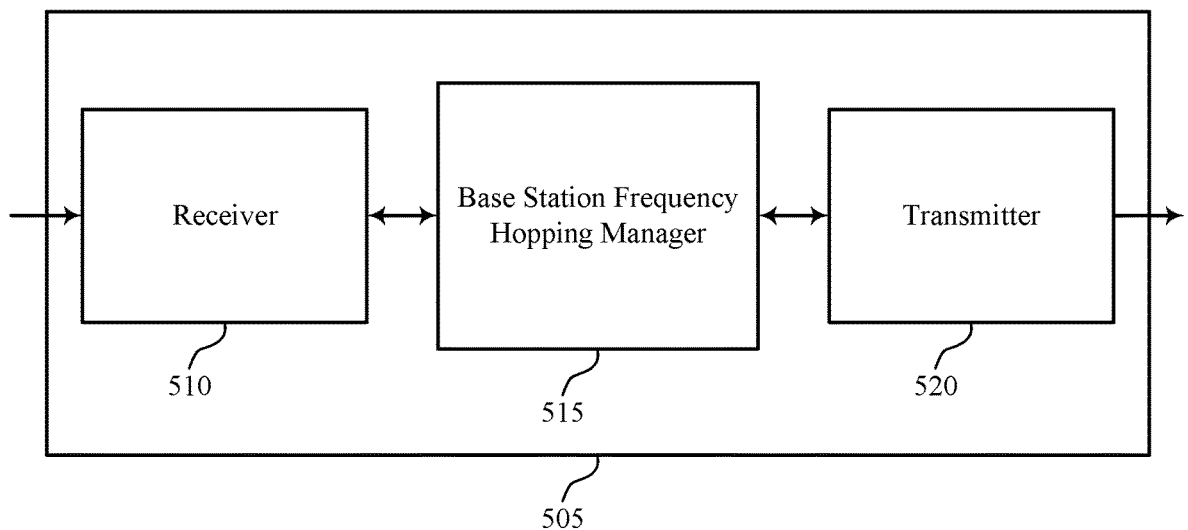
FIGS. 5 through 7 show block diagrams of a device that supports frequency hopping for control resource set with single carrier waveform in accordance with aspects of the present disclosure.

FIG. 5 shows a block diagram 500 of a wireless device 505 that supports frequency hopping for control resource set with single carrier waveform in accordance with aspects of the present disclosure. Wireless device 505 may be an example of aspects of a base station 105 as described herein. Wireless device 505 may include receiver 510, base station frequency hopping manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to frequency hopping for control resource set with single carrier waveform, etc.). Information may be passed on to other components of the device. The receiver 510 may be an example of aspects of the transceiver 835 described with reference to FIG. 8. The receiver 510 may utilize a single antenna or a set of antennas.

Base station frequency hopping manager 515 may be an example of aspects of the base station frequency hopping manager 815 described with reference to FIG. 8.

Base station frequency hopping manager 515 and/or at least some of its various sub-components may be implemented in hardware, software executed by a processor, firmware, or any combination thereof. If implemented in software executed by a processor, the functions of the base station frequency hopping manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station frequency hopping manager 515 and/or at least some of its various sub-components may be physically located at various positions, including being distributed such that portions of functions are implemented at different physical locations by one or more physical devices. In some examples, base station frequency hopping manager 515 and/or at least some of its various sub-components may be a separate and distinct component in accordance with various aspects of the present disclosure. In other examples, base station frequency hopping manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station frequency hopping manager 515 may identify control information to be transmitted, in a slot, to a UE. Base station frequency hopping manager 515 may determine a configuration for splitting a control resource set for the control information into a first component control resource set and a second component control resource set within a supported bandwidth of the UE, the first component control resource set being frequency diverse and time diverse from the second component control resource set. Base station frequency hopping manager 515 may transmit the configuration to the UE.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
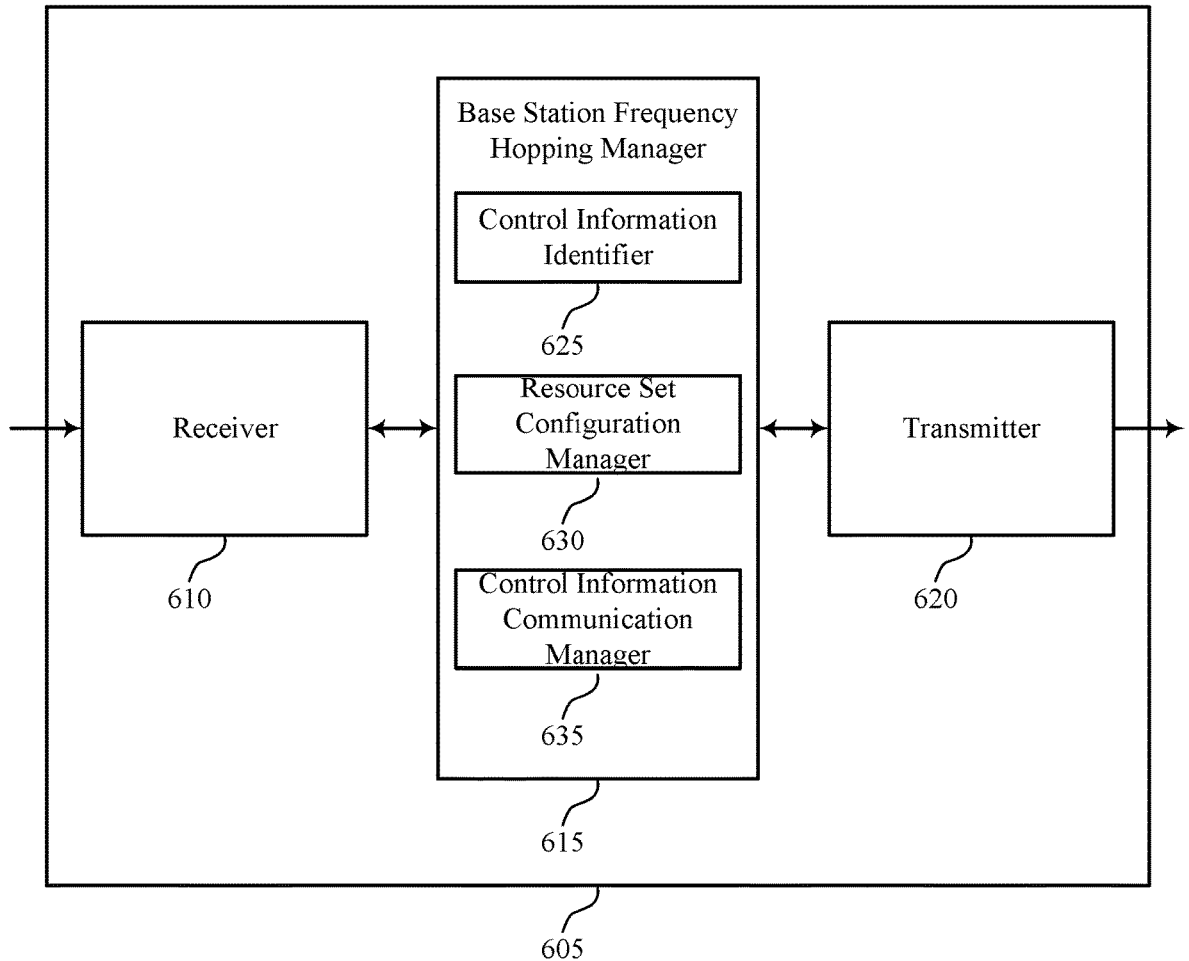

FIG. 6 shows a block diagram 600 of a wireless device 605 that supports frequency hopping for control resource set with single carrier waveform in accordance with aspects of the present disclosure. Wireless device 605 may be an example of aspects of a wireless device 505 or a base station 105 as described herein. Wireless device 605 may include receiver 610, base station frequency hopping manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to frequency hopping for control resource set with single carrier waveform, etc.). Information may be passed on to other components of the device. The receiver 610 may be an example of aspects of the transceiver 835 described with reference to FIG. 8. The receiver 610 may utilize a single antenna or a set of antennas.

Base station frequency hopping manager 615 may be an example of aspects of the base station frequency hopping manager 815 described with reference to FIG. 8. Base station frequency hopping manager 615 may also include control information identifier 625, resource set configuration manager 630, and control information communication manager 635.

Control information identifier 625 may identify control information to be transmitted, in a slot, to a UE.

Resource set configuration manager 630 may determine a configuration for splitting a control resource set for the control information into a first component control resource set and a second component control resource set within a supported bandwidth of the UE, the first component control resource set being frequency diverse and time diverse from the second component control resource set. In some cases, the first component control resource set is a same size as the second component control resource set with respect to time-frequency resources.

Control information communication manager 635 may transmit the configuration to the UE. Control information communication manager 635 may transmit the first component control resource set including a first portion of coded bits of the control information to the UE and transmit the second component control resource set including a second portion of coded bits of the control information to the UE.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
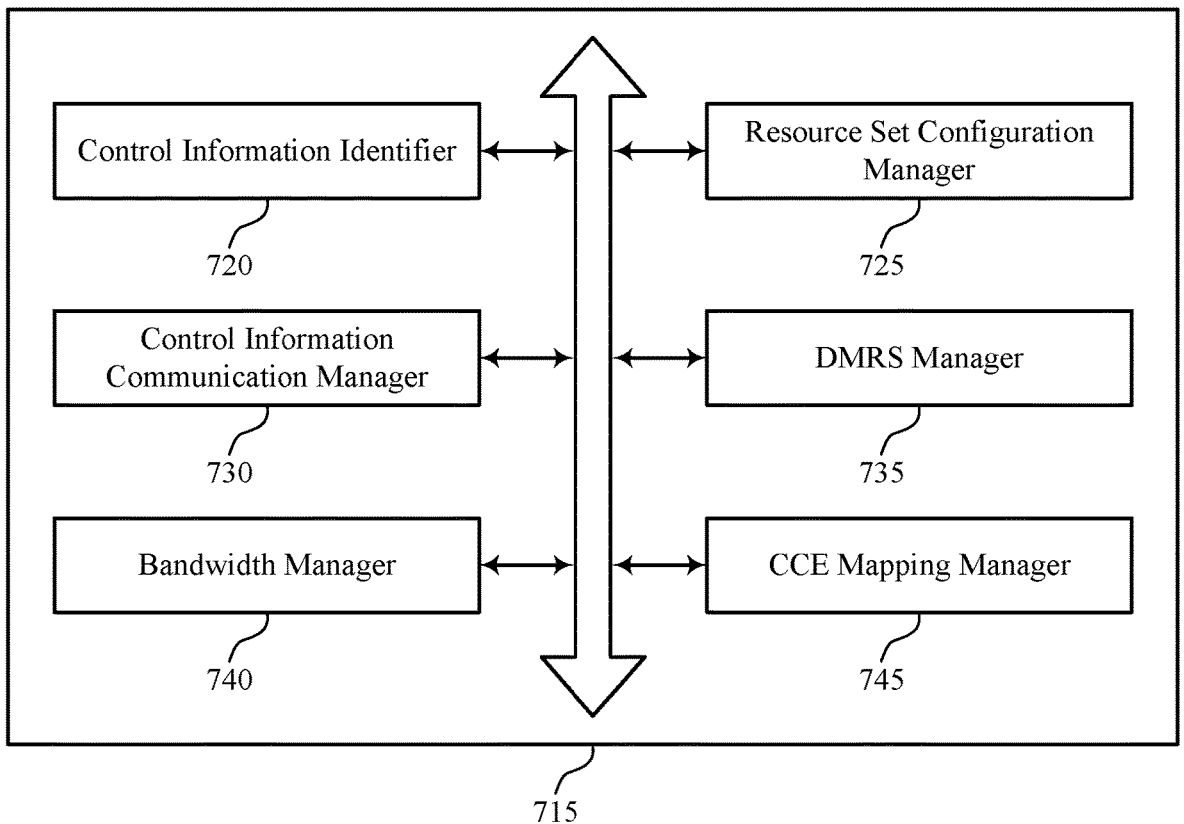

FIG. 7 shows a block diagram 700 of a base station frequency hopping manager 715 that supports frequency hopping for control resource set with single carrier waveform in accordance with aspects of the present disclosure. The base station frequency hopping manager 715 may be an example of aspects of a base station frequency hopping manager 515, a base station frequency hopping manager 615, or a base station frequency hopping manager 815 described with reference to FIGS. 5, 6, and 8. The base station frequency hopping manager 715 may include control information identifier 720, resource set configuration manager 725, control information communication manager 730, DMRS manager 735, bandwidth manager 740, and CCE mapping manager 745. Each of these modules may communicate, directly or indirectly, with one another (e.g., via one or more buses).

Control information identifier 720 may identify control information to be transmitted, in a slot, to a UE. In some cases, the control information is to be transmitted to the UE in a single carrier transmission.

Resource set configuration manager 725 may determine a configuration for splitting a control resource set for the control information into a first component control resource set and a second component control resource set within a supported bandwidth of the UE, the first component control resource set being frequency diverse and time diverse from the second component control resource set. In some cases, the first component control resource set is a same size as the second component control resource set with respect to time-frequency resources.

Control information communication manager 730 may transmit the configuration to the UE. Control information communication manager 730 may transmit the first component control resource set including a first portion of coded bits of the control information to the UE and transmit the second component control resource set including a second portion of coded bits of the control information to the UE.

DMRS manager 735 may transmit a DMRS and the control information in the first component control resource set and the second component control resource set according to the configuration.

Bandwidth manager 740 may select, based on the supported bandwidth of the UE, frequency ranges of the first component control resource set and the second component control resource set. In some cases, a first frequency range associated with the first component control resource set and a second frequency range associated with the second component control resource set are proximate to opposing ends of the supported bandwidth of the UE. In some cases, the supported bandwidth of the UE is less than an available system bandwidth.

CCE mapping manager 745 may identify one or more CCEs associated with the control information. CCE mapping manager 745 may map each CCE of the one or more CCEs into a first component CCE associated with the first component control resource set and a second component CCE associated with the second component control resource set. CCE mapping manager 745 may map each CCE of the one or more CCEs according to a component CCE mapping scheme. CCE mapping manager 745 may permutate the component CCEs within each of the first component control resource set and the second component control resource set using the component CCE index and a random seed, and map each component CCE in the first component control resource set and the second component control resource set according to the permutated component CCE index. In some cases, the component CCE mapping scheme includes mapping each component CCE sequentially in time between the first component control resource set and the second component control resource set. In some cases, the component CCE mapping scheme includes: indexing each component CCE sequentially in time within each of the first component control resource set and the second component control resource set. In some cases, the random seed is selected based on one or more of a slot index of the slot, an index associated with each of the first component control resource set and the second component control resource set, and a base station configured parameter.

Figure 8:
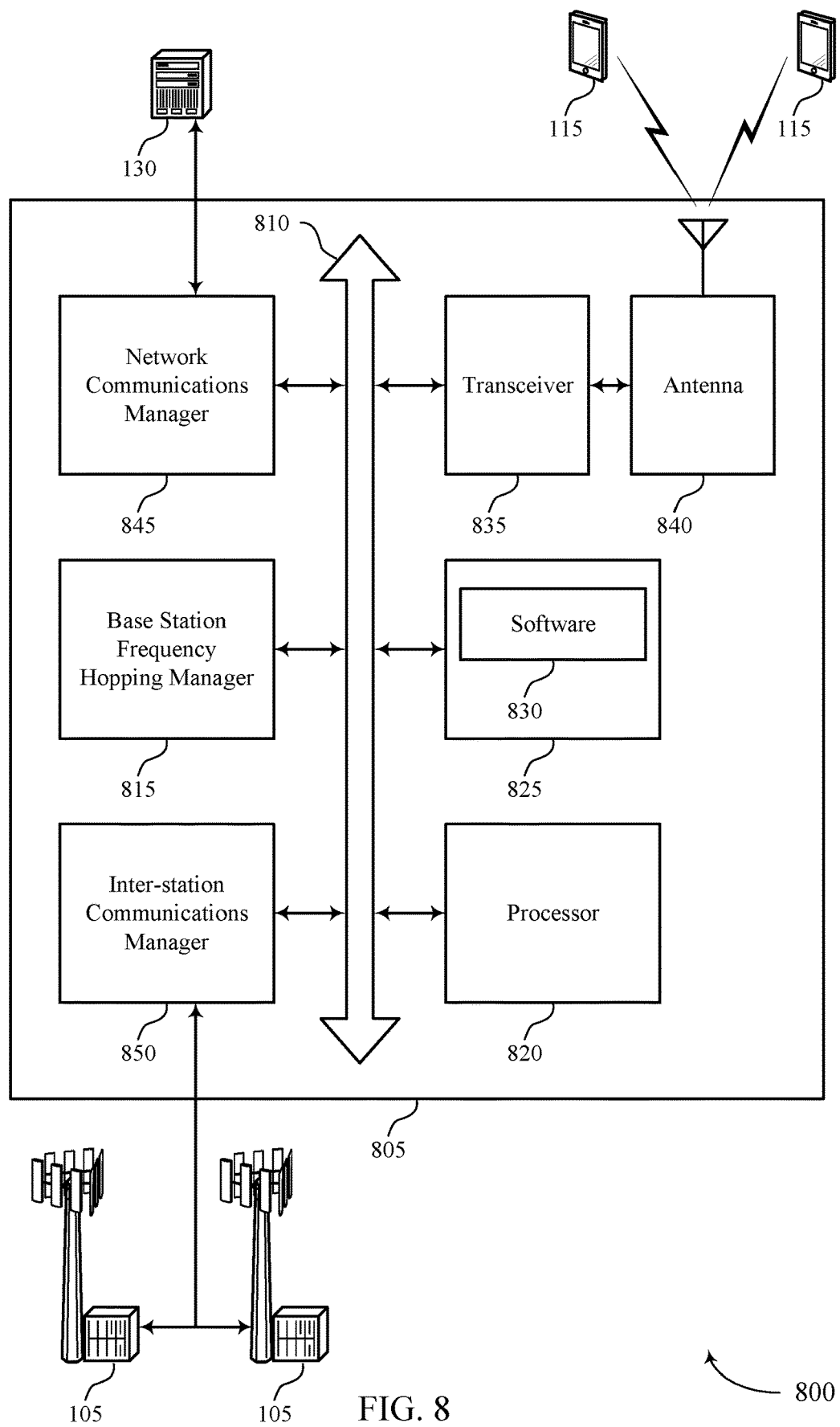
FIG. 8 illustrates a block diagram of a system including a base station that supports frequency hopping for control resource set with single carrier waveform in accordance with aspects of the present disclosure.

FIG. 8 shows a diagram of a system 800 including a device 805 that supports frequency hopping for control resource set with single carrier waveform in accordance with aspects of the present disclosure. Device 805 may be an example of or include the components of wireless device 505, wireless device 605, or a base station 105 as described herein. Device 805 may include components for bi-directional voice and data communications including components for transmitting and receiving communications, including base station frequency hopping manager 815, processor 820, memory 825, software 830, transceiver 835, antenna 840, network communications manager 845, and inter-station communications manager 850. These components may be in electronic communication via one or more busses (e.g., bus 810). Device 805 may communicate wirelessly with one or more UEs 115.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting frequency hopping for control resource set with single carrier waveform).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support frequency hopping for control resource set with single carrier waveform. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

Network communications manager 845 may manage communications with the core network (e.g., via one or more wired backhaul links). For example, the network communications manager 845 may manage the transfer of data communications for client devices, such as one or more UEs 115.

Inter-station communications manager 850 may manage communications with other base stations 105, and may include a controller or scheduler for controlling communications with UEs 115 in cooperation with other base stations 105. For example, the inter-station communications manager 850 may coordinate scheduling for transmissions to UEs 115 for various interference mitigation techniques such as beamforming or joint transmission. In some examples, inter-station communications manager 850 may provide an X2 interface within an LTE/LTE-A wireless communication network technology to provide communication between base stations 105.

Figure 9:
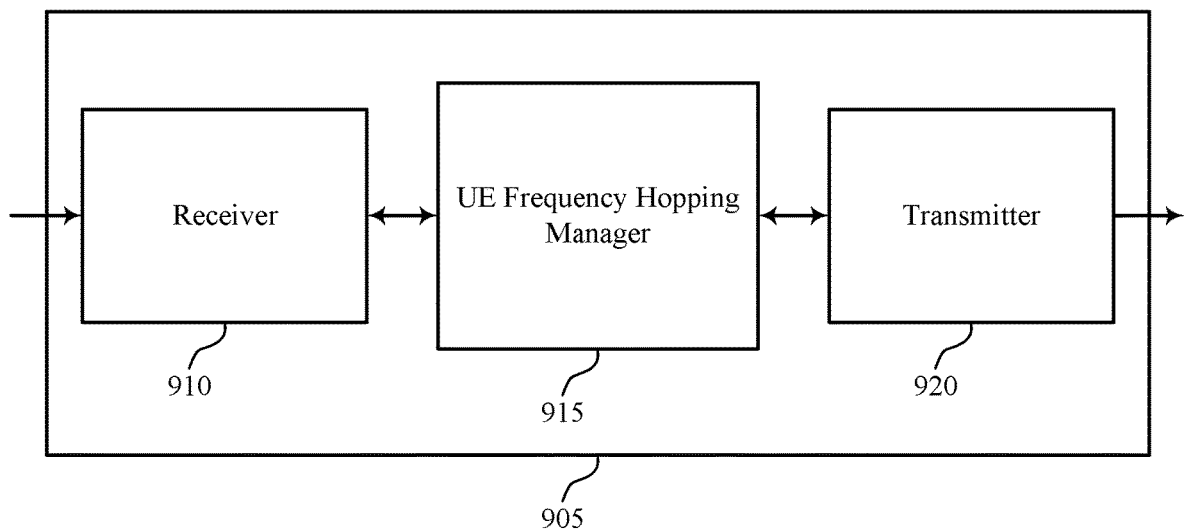
FIGS. 9 through 11 show block diagrams of a device that supports frequency hopping for control resource set with single carrier waveform in accordance with aspects of the present disclosure.

FIG. 9 shows a block diagram 900 of a wireless device 905 that supports frequency hopping for control resource set with single carrier waveform in accordance with aspects of the present disclosure. Wireless device 905 may be an example of aspects of a UE 115 as described herein. Wireless device 905 may include receiver 910, UE frequency hopping manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to frequency hopping for control resource set with single carrier waveform, etc.). Information may be passed on to other components of the device. The receiver 910 may be an example of aspects of the transceiver 1235 described with reference to FIG. 12. The receiver 910 may utilize a single antenna or a set of antennas.

UE frequency hopping manager 915 may be an example of aspects of the UE frequency hopping manager 1215 described with reference to FIG. 12.

UE frequency hopping manager 915 and/or at least some of its various sub-components may be implemented in hardware, software executed by a processor, firmware, or any combination thereof. If implemented in software executed by a processor, the functions of the UE frequency hopping manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE frequency hopping manager 915 and/or at least some of its various sub-components may be physically located at various positions, including being distributed such that portions of functions are implemented at different physical locations by one or more physical devices. In some examples, UE frequency hopping manager 915 and/or at least some of its various sub-components may be a separate and distinct component in accordance with various aspects of the present disclosure. In other examples, UE frequency hopping manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE frequency hopping manager 915 may receive, at a UE, signaling identifying a configuration for a control resource set in a slot, where the control resource set is split into a first component control resource set and a second component control resource set within a supported bandwidth of the UE, the first component control resource set being frequency diverse and time diverse from the second component control resource set. UE frequency hopping manager 915 may receive control information in the first component control resource set and the second component control resource set according to the configuration.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
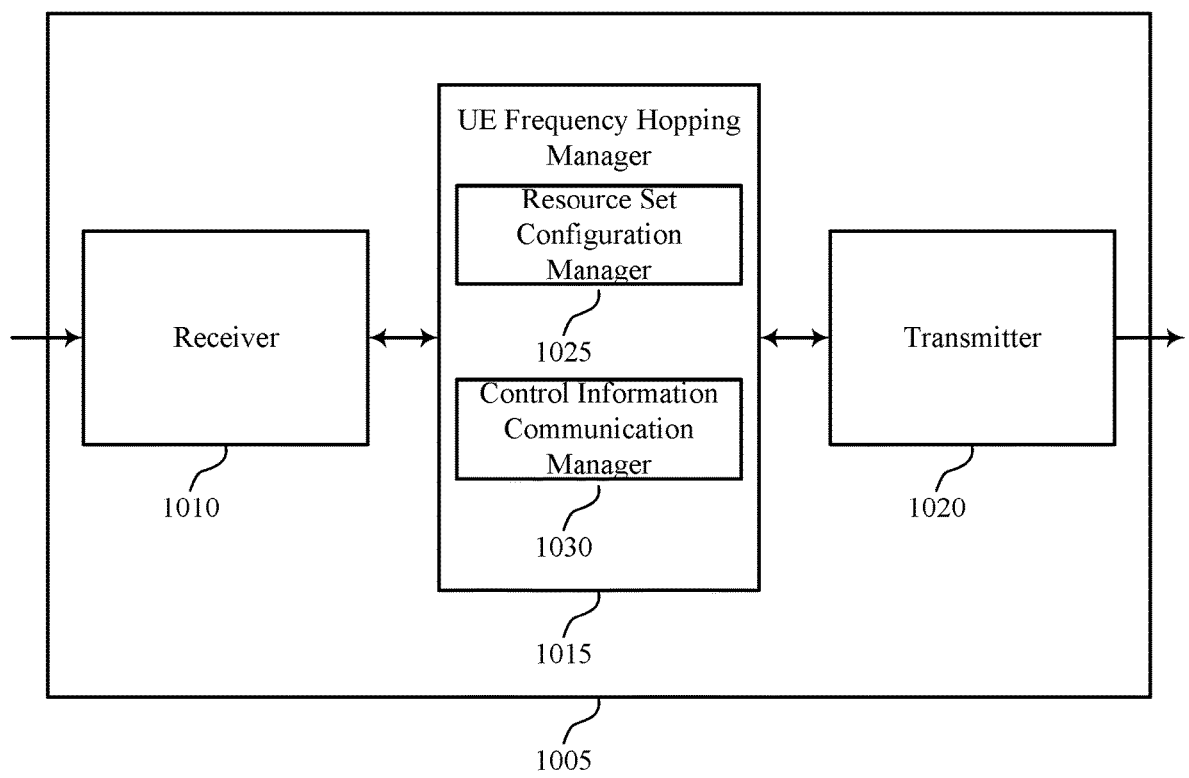

FIG. 10 shows a block diagram 1000 of a wireless device 1005 that supports frequency hopping for control resource set with single carrier waveform in accordance with aspects of the present disclosure. Wireless device 1005 may be an example of aspects of a wireless device 905 or a UE 115 as described herein Wireless device 1005 may include receiver 1010, UE frequency hopping manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to frequency hopping for control resource set with single carrier waveform, etc.). Information may be passed on to other components of the device. The receiver 1010 may be an example of aspects of the transceiver 1235 described with reference to FIG. 12. The receiver 1010 may utilize a single antenna or a set of antennas.

UE frequency hopping manager 1015 may be an example of aspects of the UE frequency hopping manager 1215 described with reference to FIG. 12. UE frequency hopping manager 1015 may also include resource set configuration manager 1025 and control information communication manager 1030.

Resource set configuration manager 1025 may receive, at a UE, signaling identifying a configuration for a control resource set in a slot, where the control resource set is split into a first component control resource set and a second component control resource set within a supported bandwidth of the UE, the first component control resource set being frequency diverse and time diverse from the second component control resource set. In some cases, the first component control resource set is the same size as the second component control resource set with respect to time-frequency resources. In some cases, the signaling identifying the configuration for the control resource set is received in a single carrier transmission.

Control information communication manager 1030 may receive control information in the first component control resource set and the second component control resource set according to the configuration.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
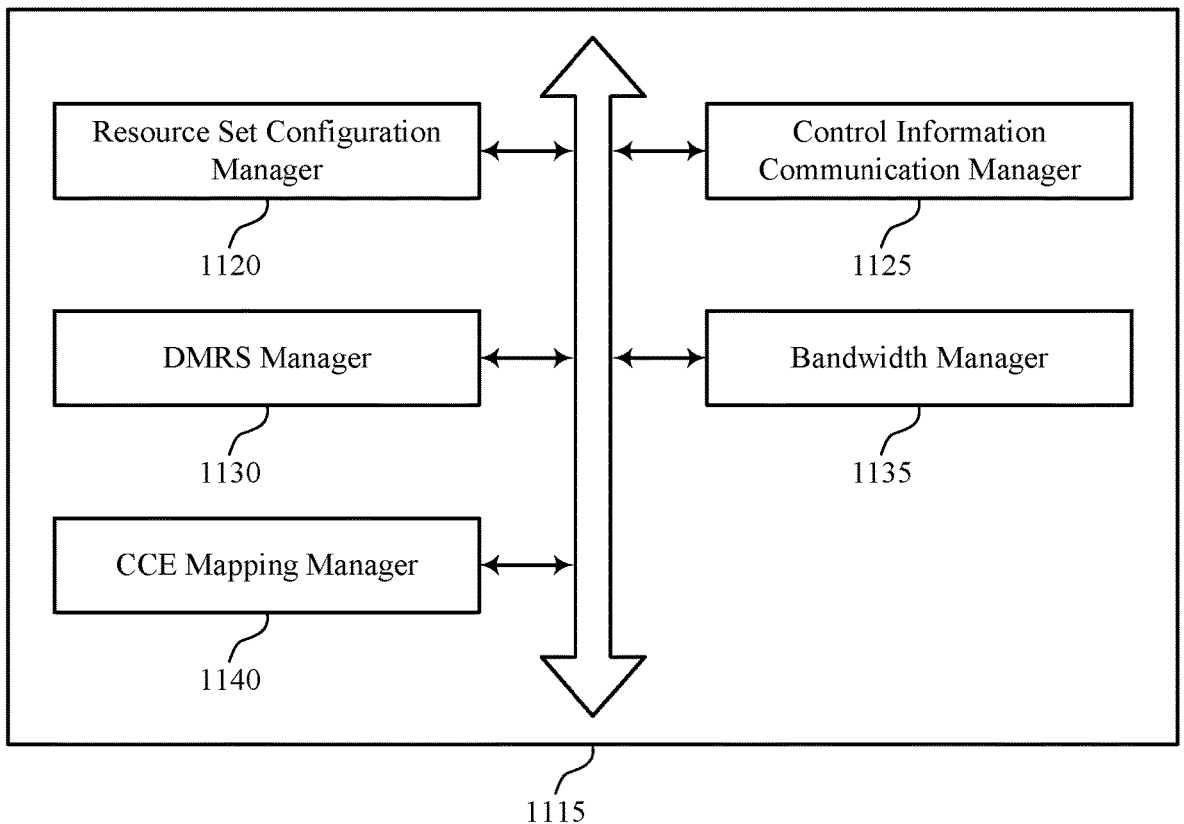

FIG. 11 shows a block diagram 1100 of a UE frequency hopping manager 1115 that supports frequency hopping for control resource set with single carrier waveform in accordance with aspects of the present disclosure. The UE frequency hopping manager 1115 may be an example of aspects of a UE frequency hopping manager 1215 described with reference to FIGS. 9, 10, and 12. The UE frequency hopping manager 1115 may include resource set configuration manager 1120, control information communication manager 1125, DMRS manager 1130, bandwidth manager 1135, and CCE mapping manager 1140. Each of these modules may communicate, directly or indirectly, with one another (e.g., via one or more buses).

Resource set configuration manager 1120 may receive, at a UE, signaling identifying a configuration for a control resource set in a slot, where the control resource set is split into a first component control resource set and a second component control resource set within a supported bandwidth of the UE, the first component control resource set being frequency diverse and time diverse from the second component control resource set. In some cases, the first component control resource set is the same size as the second component control resource set with respect to time-frequency resources. In some cases, the signaling identifying the configuration for the control resource set is received in a single carrier transmission.

Control information communication manager 1125 may receive control information in the first component control resource set and the second component control resource set according to the configuration.

DMRS manager 1130 may receive a DMRS in the first component control resource set and the second component control resource set according to the configuration.

Bandwidth manager 1135 may identify, based on a supported bandwidth of the UE, a first frequency range associated with the first component control resource set used for transmitting the control information and a second frequency range associated with the second component control resource set used for transmitting the control information. Bandwidth manager 1135 may receive the signaling identifying the configuration during a RRC exchange between a base station and the UE. In some cases, the first frequency range and the second frequency range are proximate to opposing ends of the supported bandwidth of the UE.

CCE mapping manager 1140 may identify a mapping of one or more CCEs associated with the control information, the mapping including each CCE of the one or more CCEs being mapped into a first component CCE associated with the first component control resource set and a second component CCE associated with the second component control resource set. In some cases, the mapping includes each component CCE being mapped sequentially in time between the first component control resource set and the second component control resource set. In some cases, the mapping includes each component CCE being indexed sequentially in time within each of the first component control resource set and the second component control resource set, the component CCEs within each of the first component control resource set and the second component control resource set being permutated using the component CCE index and a random seed, and each component CCE in the first component control resource set and the second component control resource set being mapped according to the permutated component CCE index.

Figure 12:
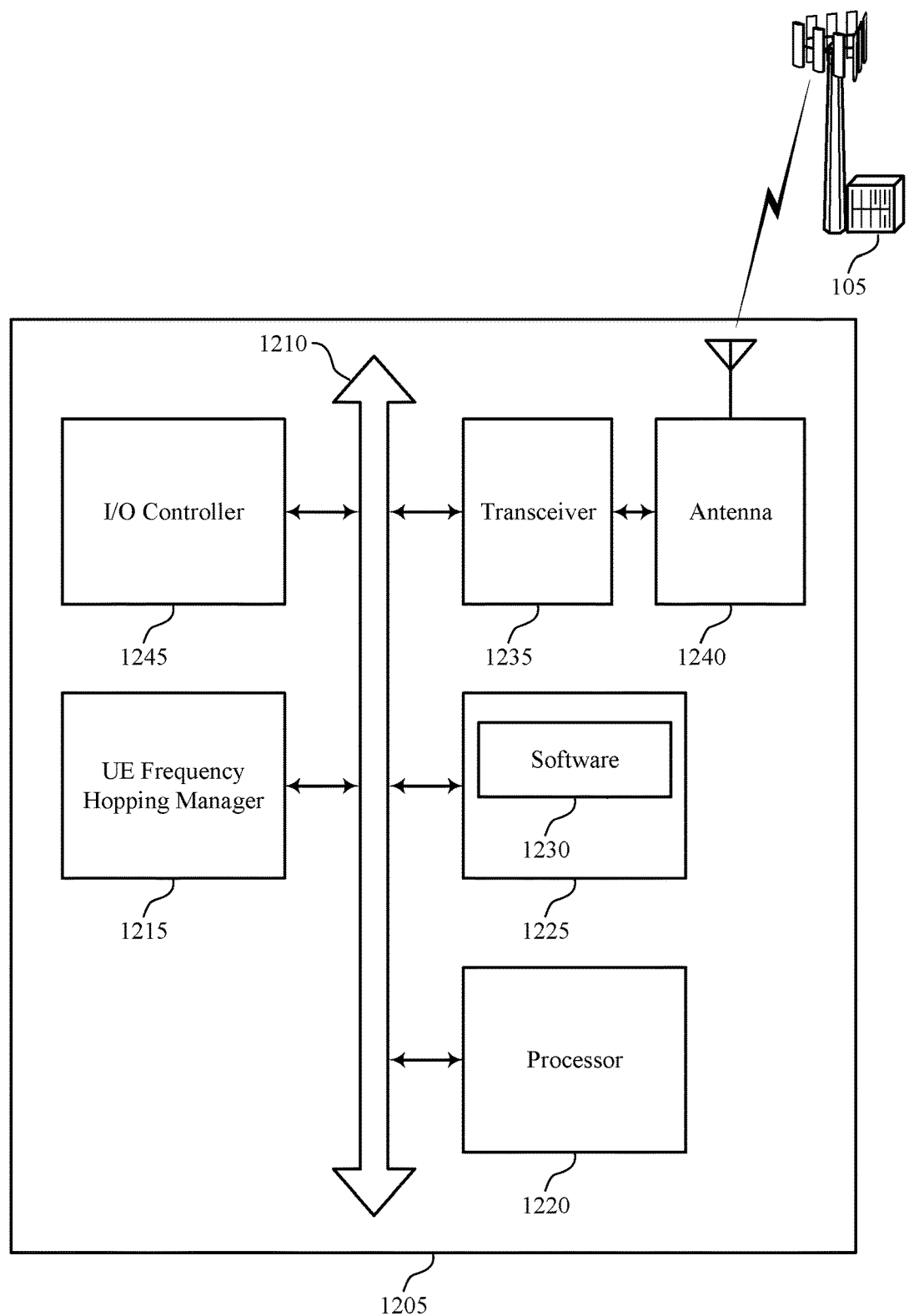
FIG. 12 illustrates a block diagram of a system including a UE that supports frequency hopping for control resource set with single carrier waveform in accordance with aspects of the present disclosure.

FIG. 12 shows a diagram of a system 1200 including a device 1205 that supports frequency hopping for control resource set with single carrier waveform in accordance with aspects of the present disclosure. Device 1205 may be an example of or include the components of UE 115 as described herein. Device 1205 may include components for bi-directional voice and data communications including components for transmitting and receiving communications, including UE frequency hopping manager 1215, processor 1220, memory 1225, software 1230, transceiver 1235, antenna 1240, and I/O controller 1245. These components may be in electronic communication via one or more busses (e.g., bus 1210). Device 1205 may communicate wirelessly with one or more base stations 105.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting frequency hopping for control resource set with single carrier waveform).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support frequency hopping for control resource set with single carrier waveform. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
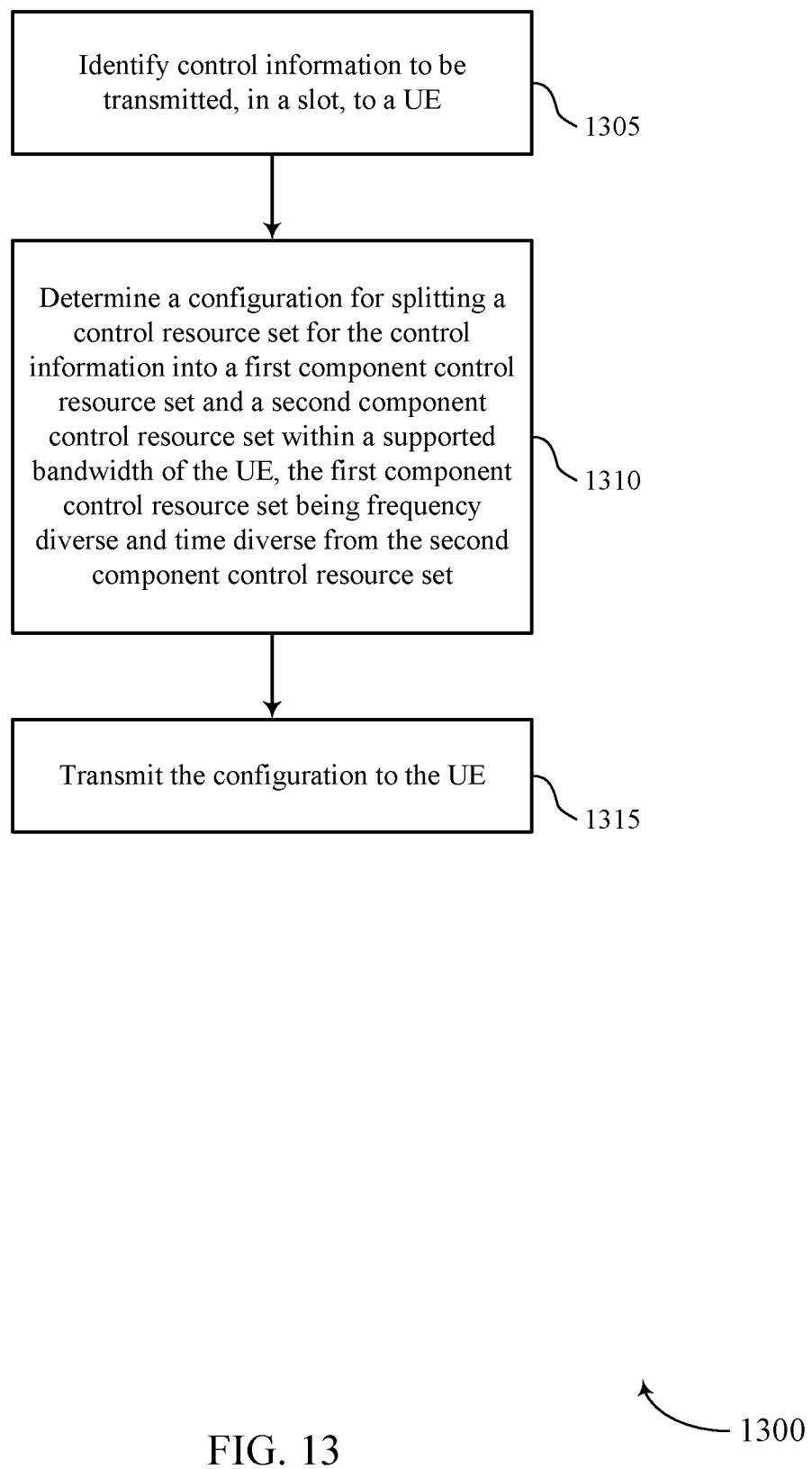
FIGS. 13 through 16 illustrate methods for frequency hopping for control resource set with single carrier waveform in accordance with aspects of the present disclosure.

FIG. 13 shows a flowchart illustrating a method 1300 for frequency hopping for control resource set with single carrier waveform in accordance with aspects of the present disclosure. The operations of method 1300 may be implemented by a base station 105 or its components as described herein. For example, the operations of method 1300 may be performed by a base station frequency hopping manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1305 the base station 105 may identify control information to be transmitted, in a slot, to a UE. The operations of block 1305 may be performed according to the methods described herein. In certain examples, aspects of the operations of block 1305 may be performed by a control information identifier as described with reference to FIGS. 5 through 8.

At block 1310 the base station 105 may determine a configuration for splitting a control resource set for the control information into a first component control resource set and a second component control resource set within a supported bandwidth of the UE, the first component control resource set being frequency diverse and time diverse from the second component control resource set. The operations of block 1310 may be performed according to the methods described herein. In certain examples, aspects of the operations of block 1310 may be performed by a resource set configuration manager as described with reference to FIGS. 5 through 8.

At block 1315 the base station 105 may transmit the configuration to the UE. The operations of block 1315 may be performed according to the methods described herein. In certain examples, aspects of the operations of block 1315 may be performed by a control information communication manager as described with reference to FIGS. 5 through 8.

Figure 14:
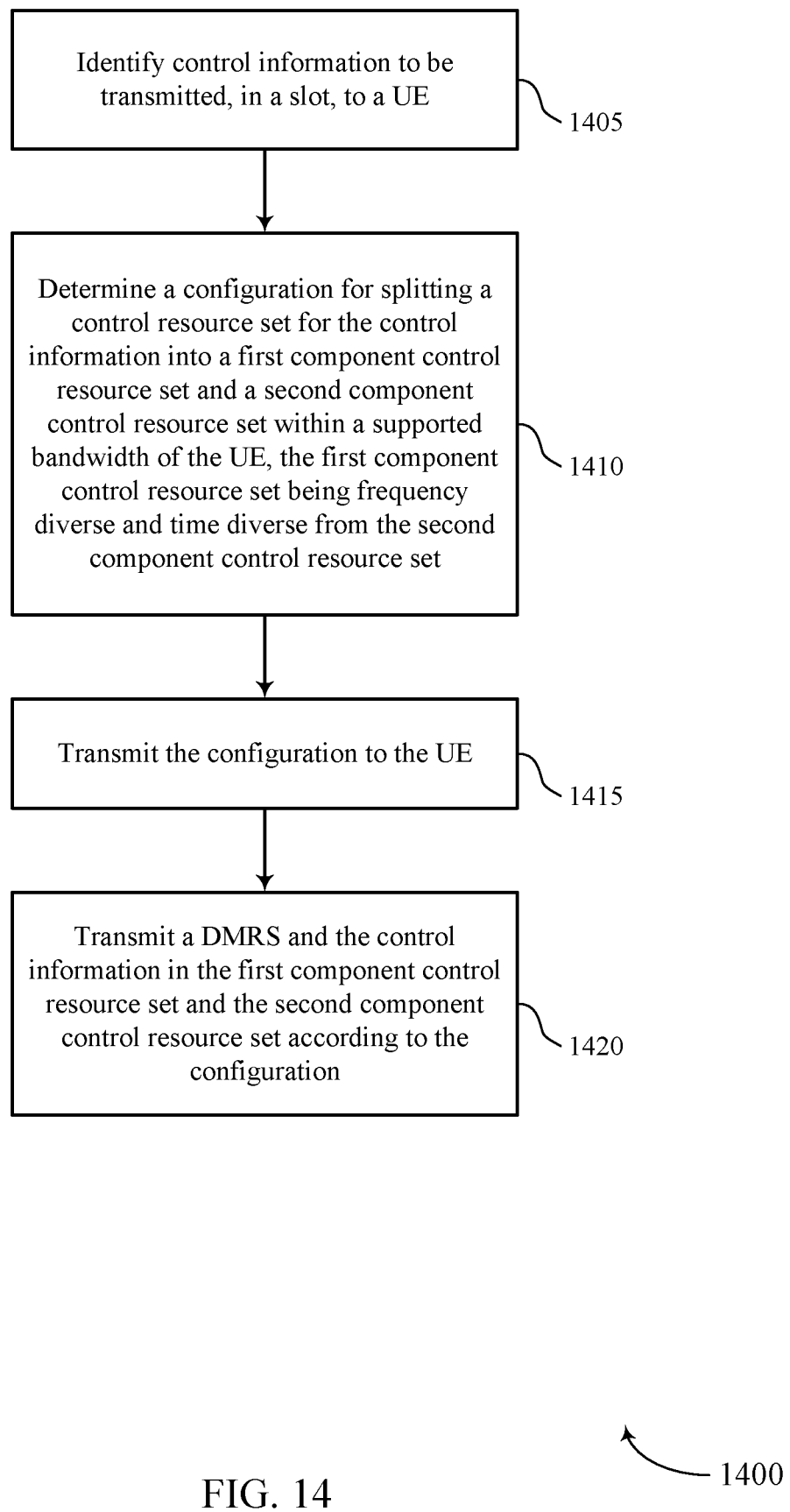

FIG. 14 shows a flowchart illustrating a method 1400 for frequency hopping for control resource set with single carrier waveform in accordance with aspects of the present disclosure. The operations of method 1400 may be implemented by a base station 105 or its components as described herein. For example, the operations of method 1400 may be performed by a base station frequency hopping manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1405 the base station 105 may identify control information to be transmitted, in a slot, to a UE. The operations of block 1405 may be performed according to the methods described herein. In certain examples, aspects of the operations of block 1405 may be performed by a control information identifier as described with reference to FIGS. 5 through 8.

At block 1410 the base station 105 may determine a configuration for splitting a control resource set for the control information into a first component control resource set and a second component control resource set within a supported bandwidth of the UE, the first component control resource set being frequency diverse and time diverse from the second component control resource set. The operations of block 1410 may be performed according to the methods described herein. In certain examples, aspects of the operations of block 1410 may be performed by a resource set configuration manager as described with reference to FIGS. 5 through 8.

At block 1415 the base station 105 may transmit the configuration to the UE. The operations of block 1415 may be performed according to the methods described herein. In certain examples, aspects of the operations of block 1415 may be performed by a control information communication manager as described with reference to FIGS. 5 through 8.

At block 1420 the base station 105 may transmit a DMRS and the control information in the first component control resource set and the second component control resource set according to the configuration. The operations of block 1420 may be performed according to the methods described herein. In certain examples, aspects of the operations of block 1420 may be performed by a DMRS manager as described with reference to FIGS. 5 through 8.

Figure 15:
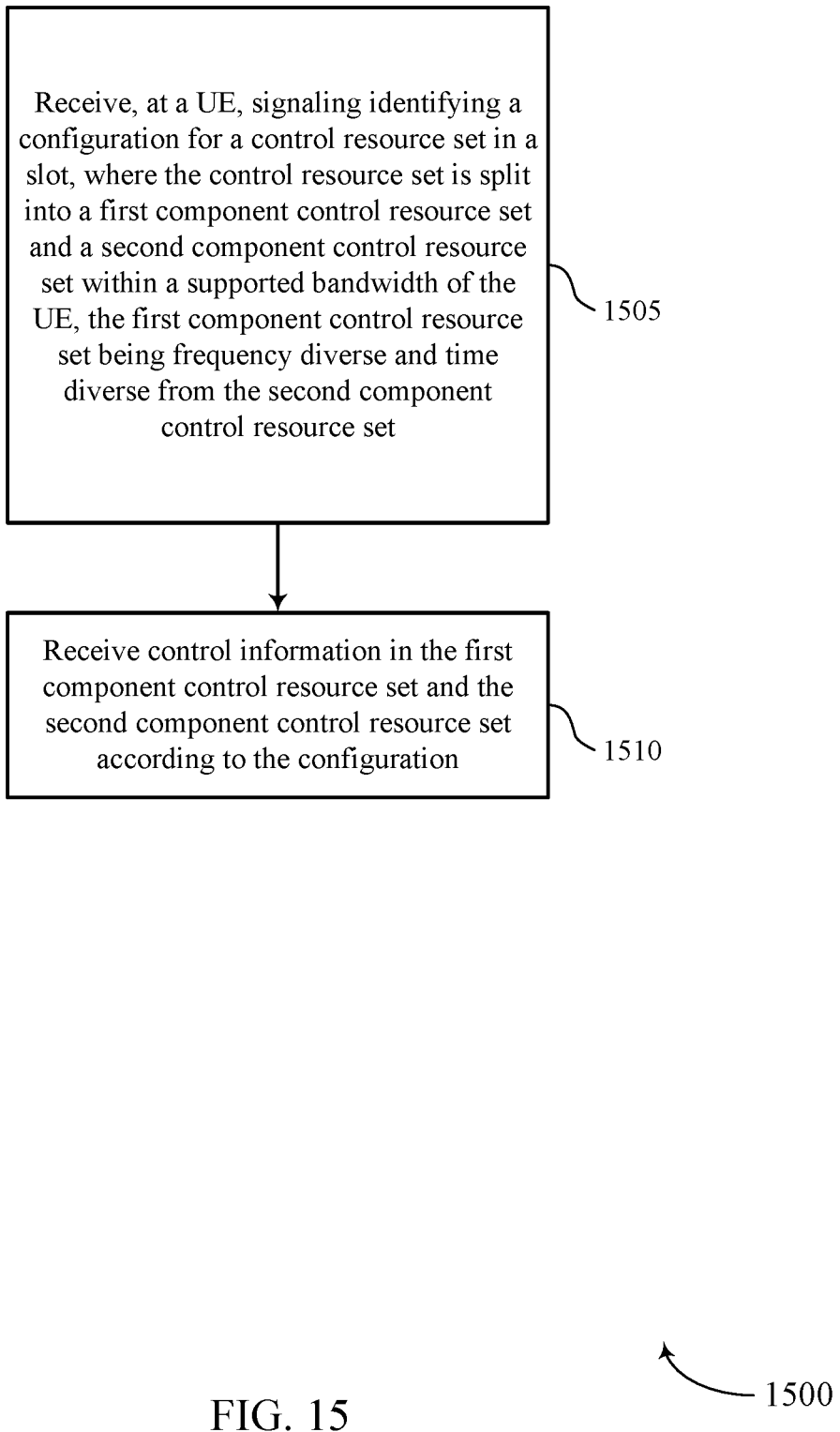

FIG. 15 shows a flowchart illustrating a method 1500 for frequency hopping for control resource set with single carrier waveform in accordance with aspects of the present disclosure. The operations of method 1500 may be implemented by a UE 115 or its components as described herein. For example, the operations of method 1500 may be performed by a UE frequency hopping manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive, at a UE, signaling identifying a configuration for a control resource set in a slot, wherein the control resource set is split into a first component control resource set and a second component control resource set within a supported bandwidth of the UE, the first component control resource set being frequency diverse and time diverse from the second component control resource set. The operations of block 1505 may be performed according to the methods described herein. In certain examples, aspects of the operations of block 1505 may be performed by a resource set configuration manager as described with reference to FIGS. 9 through 12.

At block 1510 the UE 115 may receive control information in the first component control resource set and the second component control resource set according to the configuration. The operations of block 1510 may be performed according to the methods described herein. In certain examples, aspects of the operations of block 1510 may be performed by a control information communication manager as described with reference to FIGS. 9 through 12.

Figure 16:
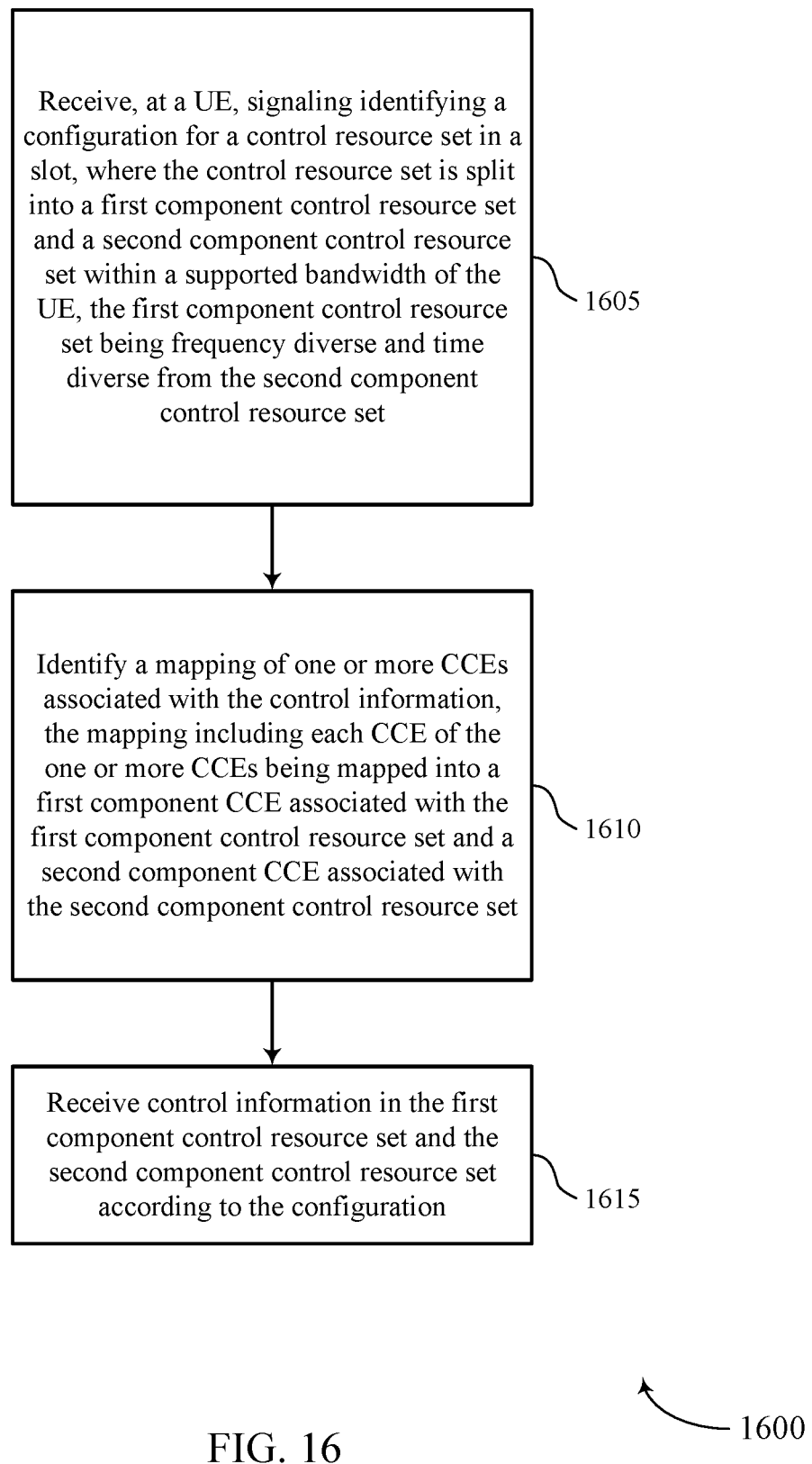

FIG. 16 shows a flowchart illustrating a method 1600 for frequency hopping for control resource set with single carrier waveform in accordance with aspects of the present disclosure. The operations of method 1600 may be implemented by a UE 115 or its components as described herein. For example, the operations of method 1600 may be performed by a UE frequency hopping manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive, at a UE, signaling identifying a configuration for a control resource set in a slot, wherein the control resource set is split into a first component control resource set and a second component control resource set within a supported bandwidth of the UE, the first component control resource set being frequency diverse and time diverse from the second component control resource set. The operations of block 1605 may be performed according to the methods described herein. In certain examples, aspects of the operations of block 1605 may be performed by a resource set configuration manager as described with reference to FIGS. 9 through 12.

At block 1610 the UE 115 may identify a mapping of one or more CCEs associated with the control information, the mapping comprising each CCE of the one or more CCEs being mapped into a first component CCE associated with the first component control resource set and a second component CCE associated with the second component control resource set. The operations of block 1610 may be performed according to the methods described herein. In certain examples, aspects of the operations of block 1610 may be performed by a CCE mapping manager as described with reference to FIGS. 9 through 12.

At block 1615 the UE 115 may receive control information in the first component control resource set and the second component control resource set according to the configuration. The operations of block 1615 may be performed according to the methods described herein. In certain examples, aspects of the operations of block 1615 may be performed by a control information communication manager as described with reference to FIGS. 9 through 12.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term eNB may be generally used to describe the base stations. The wireless communication system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, gNB, Home NodeB, a Home eNodeB, or some other suitable terminology. The geographic coverage area for a base station may be divided into sectors making up only a portion of the coverage area. The wireless communication system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communication system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying control information to be transmitted, in a slot, to a user equipment (UE);
   determining a configuration for splitting a control resource set for the control information into a first component control resource set that comprises a first portion of the control information and a second component control resource set that comprises a second portion of the control information during the slot and within a supported bandwidth of the UE, the first component control resource set being frequency diverse and time diverse from the second component control resource set;
   identifying one or more control channel elements (CCEs) associated with the control information; and
   mapping each CCE of the one or more CCEs into a first component CCE associated with the first component control resource set and a second component CCE associated with the second component control resource set;
   indexing each component CCE sequentially in time within each of the first component control resource set and the second component control resource set;
   permutating the component CCEs within each of the first component control resource set and the second component control resource set using the component CCE index and a random seed; and
   mapping each component CCE in the first component control resource set and the second component control resource set according to the permutated component CCE index; and
   transmitting, during the slot, a first demodulation reference signal (DMRS) and the control information to the UE in the first component control resource set and transmitting during the slot a second DMRS to the UE in the second component control resource set according to the configuration;
   and
   transmitting the configuration to the UE.

2. The method of claim 1, further comprising:
   transmitting, during the slot, the first component control resource set comprising a first portion of coded bits of the control information to the UE; and
   transmitting, during the slot, the second component control resource set comprising a second portion of coded bits of the control information to the UE.

3. The method of claim 1, further comprising:
   selecting, based at least in part on the supported bandwidth of the UE, frequency ranges of the first component control resource set and the second component control resource set.

4. The method of claim 1, wherein a first frequency range associated with the first component control resource set and a second frequency range associated with the second component control resource set are proximate to opposing ends of the supported bandwidth of the UE.

5. The method of claim 1, wherein the supported bandwidth of the UE is less than an available system bandwidth.

6. The method of claim 1, wherein the first component control resource set is a same size as the second component control resource set with respect to time-frequency resources.

7. The method of claim 1, wherein the component CCE mapping scheme comprises mapping each component CCE sequentially in time between the first component control resource set and the second component control resource set.

8. The method of claim 1, wherein the random seed is selected based on one or more of a slot index of the slot, an index associated with each of the first component control resource set and the second component control resource set, and a base station configured parameter.

9. The method of claim 1, wherein the control information is to be transmitted to the UE in a single carrier transmission.

10. A method for wireless communication, comprising:
    receiving, at a user equipment (UE), signaling identifying a configuration for a control resource set in a slot, wherein the control resource set is split into a first component control resource set that comprises a first portion of the control information and a second component control resource set that comprises a second portion of the control information within a supported bandwidth of the UE, the first component control resource set being frequency diverse and time diverse from the second component control resource set;
    receiving, during the slot, a first demodulation reference signal (DMRS) from a base station in the first component control resource set and receiving during the slot a second DMRS in the second component control resource set according to the configuration;
    identifying a mapping of one or more control channel elements (CCEs) associated with the control information, the mapping comprising each CCE of the one or more CCEs being mapped into a first component CCE associated with the first component control resource set and a second component CCE associated with the second component control resource set;
    wherein the mapping comprises each component CCE being indexed sequentially in time within each of the first component control resource set and the second component control resource set, the component CCEs within each of the first component control resource set and the second component control resource set being permutated using the component CCE index and a random seed, and each component CCE in the first component control resource set and the second component control resource set being mapped according to the permutated component CCE index
    and
    receiving, during the slot, control information in the first component control resource set and the second component control resource set according to the configuration.

11. The method of claim 10, further comprising:
    identifying, based at least in part on a supported bandwidth of the UE, a first frequency range associated with the first component control resource set used for transmitting the control information and a second frequency range associated with the second component control resource set used for transmitting the control information.

12. The method of claim 11, wherein the first frequency range and the second frequency range are proximate to opposing ends of the supported bandwidth of the UE.

13. The method of claim 11, further comprising:
receiving the signaling identifying the configuration during a radio resource configuration (RRC) exchange between a base station and the UE.

14. The method of claim 10, wherein the first component control resource set is the same size as the second component control resource set with respect to time-frequency resources.

15. The method of claim 10, wherein the signal identifying the configuration for the control resource set in a slot is received in a single carrier transmission.

16. An apparatus for wireless communication, comprising:
a processor;
memory in electronic communication with the processor; and
instructions stored in the memory and executable by the processor to cause the apparatus to:
identify control information to be transmitted, in a slot, to a user equipment (UE);
determine a configuration for splitting a control resource set for the control information into a first component control resource set that comprises a first portion of the control information and a second component control resource set that comprises a second portion of the control information during the slot and within a supported bandwidth of the UE, the first component control resource set being frequency diverse and time diverse from the second component control resource set;
identify one or more control channel elements (CCEs) associated with the control information; and
map each CCE of the one or more CCEs into a first component CCE associated with the first component control resource set and a second component CCE associated with the second component control resource set;
index each component CCE sequentially in time within each of the first component control resource set and the second component control resource set;
permutate the component CCEs within each of the first component control resource set and the second component control resource set using the component CCE index and a random seed; and
map each component CCE in the first component control resource set and the second component control resource set according to the permutated component CCE index; and
transmit, during the slot, a first demodulation reference signal (DMRS) and the control information to the UE in the first component control resource set and transmit during the slot a second DMRS in the second component control resource set according to the configuration; and
transmit the configuration to the UE.

17. The apparatus of claim 16, wherein the instructions are further executable by the processor to cause the apparatus to:

transmit, during the slot, the first component control resource set comprising a first portion of coded bits of the control information to the UE; and
transmit, during the slot, the second component control resource set comprising a second portion of coded bits of the control information to the UE.

18. The apparatus of claim 16, wherein the instructions are further executable by the processor to cause the apparatus to:
select, based at least in part on the supported bandwidth of the UE, frequency ranges of the first component control resource set and the second component control resource set.

19. An apparatus for wireless communication, comprising:
a processor;
memory in electronic communication with the processor; and
instructions stored in the memory and executable by the processor to cause the apparatus to:
receive, at a user equipment (UE), signaling identifying a configuration for a control resource set in a slot, wherein the control resource set is split into a first component control resource set that comprises a first portion of the control information and a second component control resource set that comprises a second portion of the control information within a supported bandwidth of the UE, the first component control resource set being frequency diverse and time diverse from the second component control resource set;
receive, during the slot, a first demodulation reference signal (DMRS) from a base station in the first component control resource set and receive during the slot a second DMRS in the second component control resource set according to the configuration;
identify a mapping of one or more control channel elements (CCEs) associated with the control information, the mapping comprising each CCE of the one or more CCEs being mapped into a first component CCE associated with the first component control resource set and a second component CCE associated with the second component control resource set;
wherein the mapping comprises each component CCE being indexed sequentially in time within each of the first component control resource set and the second component control resource set, the component CCEs within each of the first component control resource set and the second component control resource set being permutated using the component CCE index and a random seed, and each component CCE in the first component control resource set and the second component control resource set being mapped according to the permutated component CCE index
and
receive, during the slot, control information in the first component control resource set and the second component control resource set according to the configuration.

20. The apparatus of claim 19, wherein the instructions are further executable by the processor to cause the apparatus to:
identify, based at least in part on a supported bandwidth of the UE, a first frequency range associated with the first component control resource set used for transmitting the control information and a second frequency range associated with the second component control resource set used for transmitting the control information.

\* \* \* \* \*